United States Patent
Iwasaki et al.

(10) Patent No.: US 6,665,267 B1
(45) Date of Patent: Dec. 16, 2003

(54) ACCESS MANAGEMENT METHOD, COMMUNICATIONS APPARATUS, AND MONITOR AND CONTROL SYSTEM

(75) Inventors: Hidetoshi Iwasaki, Kawasaki (JP); Masaaki Nagano, Koganei (JP); Youko Yamamoto, Tsukui-gun (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/394,681

(22) Filed: Sep. 13, 1999

(30) Foreign Application Priority Data

Sep. 14, 1998 (JP) .......................... 10-260034
Sep. 29, 1998 (JP) .......................... 10-275362

(51) Int. Cl.$^7$ ............................ H04L 12/26
(52) U.S. Cl. ...................... 370/241; 370/448
(58) Field of Search .................. 370/238, 238.1, 370/241, 248, 252, 218, 352, 351, 465, 419, 338, 445, 446, 447, 448

(56) References Cited

U.S. PATENT DOCUMENTS

| | | | | |
|---|---|---|---|---|
| 5,452,294 A | * | 9/1995 | Natarajan | 370/351 |
| 5,933,425 A | * | 8/1999 | Iwata | 370/252 |
| 6,215,797 B1 | * | 4/2001 | Fellman et al. | 370/465 |
| 6,363,319 B1 | * | 3/2002 | Hsu | 370/238 |
| 6,400,681 B1 | * | 6/2002 | Bertin et al. | 370/352 |
| 6,473,414 B1 | * | 10/2002 | Hartley et al. | 370/445 |

* cited by examiner

Primary Examiner—Steven Nguyen
Assistant Examiner—Phuongchau Ba Nguyen
(74) Attorney, Agent, or Firm—Finnegan, Henderson, Farabow, Garrett & Dunner, L.L.P.

(57) ABSTRACT

The present invention provides to an access management method and the communications apparatus capable of limiting an access from a monitor and control apparatus to a communications apparatus. In each of transmission apparatuses N1 to Nm, identification information of a monitor and control apparatus requesting an access is first obtained, and a uniquely determined level for each of monitor and control apparatuses WS1 to WSm is determined. A function of the monitor and control apparatuses requesting an access and its operation type are identified and, after that, it is determined on the basis of a predetermined table whether the access can be permitted or not.

3 Claims, 26 Drawing Sheets

LEVEL DETERMINATION TABLE 41

| NAMES OF MONITOR AND CONTROL APPARATUSES | LEVEL |
|---|---|
| TOKYO 1 | LEVEL1 |
| TOKYO 2 | LEVEL3 |
| HONG KONG 2 | LEVEL3 |
| OSAKA 1 | LEVEL1 |
| SAN FRAN 1 | LEVEL2 |
| HONG KONG 1 | LEVEL2 |
| LOS 2 | LEVEL3 |
| ... | ... |

FIG. 4

ACCESS DETERMINATION TABLE 42

| ACCESS OF INTEREST \ OPERATION TYPES | GET | SET | ACTION | CREATE | DELETE |
|---|---|---|---|---|---|
| FUNCTION 1 OF INTEREST | LEVEL1 LEVEL2 LEVEL3 | LEVEL1 LEVEL2 | LEVEL1 LEVEL2 | LEVEL1 | LEVEL1 |
| FUNCTION 2 OF INTEREST | LEVEL1 LEVEL2 | LEVEL1 | LEVEL1 | | |
| FUNCTION 3 OF INTEREST | LEVEL1 LEVEL2 LEVEL3 | LEVEL1 LEVEL2 | | LEVEL1 | LEVEL1 |
| ...... | | | | | |

FIG. 5

ASSOCIATING TABLE 62

| NAMES OF MONITOR AND CONTROL APPARATUSES | FILE DESCRIPTOR |
|---|---|
| TOKYO 1 | 1 |
| TOKYO 2 | 3 |
| HONG KONG 2 | 10 |
| OSAKA 1 | 6 |
| ... | ... |

FIG. 6

MEMORY A=EXPANSION RACK INFORMATION
0:NOT PRESENT, 1:PRESENT
MEMORY B=INFORMATION ABOUT THE NUMBER OF
LOW-SPEED I/F SHELVES 1-4

| MEMORY A | EXPANSION RACK 1 | EXPANSION RACK 2 | EXPANSION RACK 3 | |
|---|---|---|---|---|
|  |  |  |  |  |
| MEMORY B | EXISTING RACK | EXPANSION RACK 1 | EXPANSION RACK 2 | EXPANSION RACK 3 |
|  |  |  |  |  |

TYPE A

| COM |
|---|
| HIGH-SPEED I/F |
| LOW-SPEED I/F 1 |
| LOW-SPEED I/F 2 |

TYPE B

| COM |
|---|
| HIGH-SPEED I/F |
| LOW-SPEED I/F 1 |
| LOW-SPEED I/F 2 |
| LOW-SPEED I/F 3 |

TYPE C

| COM |
|---|
| HIGH-SPEED I/F |
| LOW-SPEED I/F 1 |
| LOW-SPEED I/F 2 |
| LOW-SPEED I/F 3 |
| LOW-SPEED I/F 4 |

TYPE D

| COM | |
|---|---|
| HIGH-SPEED I/F | |
| LOW-SPEED I/F 1 | |
| LOW-SPEED I/F 2 | LOW-SPEED I/F 3 |

TYPE E

| COM | |
|---|---|
| HIGH-SPEED I/F | |
| LOW-SPEED I/F 1 | LOW-SPEED I/F 3 |
| LOW-SPEED I/F 2 | LOW-SPEED I/F 4 |

FIG. 17

| HISTORY SCREEN NO. | MAJOR ALARM VARIATION DETECTION INFORMATION | ON DATE/TIME | OFF DATE/TIME | TOP ADDRESS OF SCREEN DATA (BITMAP, ETC.) |
|---|---|---|---|---|
| D1 | X(ON) | OCTOBER 1/ 15:00 | OCTOBER 2/ 3:10 | F8000H |
| D2 | Y(ON) | OCTOBER 1/ 15:30 | | F8100H |
| D3 | X(OFF) *  | OCTOBER 1/ 15:00 | OCTOBER 2/ 3:10 | F8200H |
| D4 | A(ON) | OCTOBER 4/ 8:00 | | F8300H |
| D5 | B(ON) | OCTOBER 4/ 8:15 | | F8400H |
| D6 | Q(ON) | OCTOBER 8/ 9:00 | | F8500H |
| ⋮ | ⋮ | ⋮ | ⋮ | ⋮ |
| Dx | P(ON) | OCTOBER 10/ 12:00 | | F8A00H |

FIG. 22

ACCESS MANAGEMENT METHOD, COMMUNICATIONS APPARATUS, AND MONITOR AND CONTROL SYSTEM

BACKGROUND OF THE INVENTION

The present invention relates to a monitoring control system and, more particularly, to a monitoring control system in an optical transmission system.

Recently, an expansion of a wide-band ISDN based on the globally unified user network interface has been requested, and the Synchronous Digital Hierarchy (SDH) capable of uniformly multiplying the various high-speed services and the existing low-speed services has been standardized. In this trend, various type of the communications apparatuses in accordance with the SDH system are developed, and large-capacity optical submarine cables are laid among the countries to mutually connect the SDH communications apparatuses provided in the respective countries.

The SDH is based on the communications using the optical fibers, and its large capacity allows transmission and reception of various control information items to be provided among the communications apparatuses. Taking advantage of this characteristic, the network connecting the communications apparatuses of the various countries to one another in the shape of a ring is constructed and provided in actual use, from the viewpoint of the resistance to the failure and the simple maintenance.

In such an international ring network system, the communications carriers of the various countries cooperate to operate the network. That is, each of the communications carriers has at least one monitor and control apparatus, and uses this to monitor the communications apparatus in the network and the network itself and execute various setting.

However, the international ring network system has a specific problem and the following one has been pointed. That is, in the above-mentioned system, the access of the monitor and control apparatuses to the communications apparatuses has not been limited to allow the communications carriers to cooperate the network. In other words, access of the monitor and control apparatus of any company to the communications apparatuses of the other companies has been unlimitedly permitted.

Furthermore, the monitor and control apparatuses have the same function for all the communications apparatuses that are to be monitored and controlled. That is, since the monitoring and controlling function for the communications apparatus in a station A (in country A) is not different from that for the communications apparatus in a station B (in country B), access to all the functions of each communications apparatus can be made.

However, each communications carrier wants to prevent some of specifically operated functions (such as an alarm generation function) in its communications apparatus from being accessed by the monitor and control apparatuses of the other countries. For this reason, it is necessary to limit the access in some manners, but the system meeting such a request has not yet been known.

In addition, in the conventional monitor and control terminal in the optical communications system, when failure is monitored, a summary screen of each optical transmission station apparatus (hereinafter called a monitored apparatus) is formed on the basis of the predetermined apparatus configuration and displayed.

In such a monitor and control terminal if the apparatus configurations of the monitored apparatuses in respective stations are different, the configuration information needs to be changed in accordance with each of monitored apparatuses to be connected, in each monitor and control terminal. Since the apparatus configurations are different in the stations, the configuration information that is set in the monitor and control terminal has to be managed in every station.

In the optical transmission system, the history of operations and the history of recovery of error generation in each monitored apparatus, the history of operations in the monitor and control apparatus, and the like are displayed on the screen as the character data items and stored inside. When some apparatus failures occur in the system or apparatuses, the stored character data items are used for diagnosis of the cause.

Further, the monitor and control terminal for monitoring and controlling the monitored apparatus by using the multi-window system, has a mounting drawing of the sub-rack level about the type of boards mounted in each of the sub-racks constituting the monitored apparatus and the order in mounting of the boards in the sub-rack, as the screen information. When the monitored apparatus informs the monitor and control terminal of the apparatus failure, the monitor and control terminal automatically opens the window which displays the mounting drawing of the sub-rack level including the board where the failure has occurred, and allows the display of the failure board to be blinked on the mounting drawing of the sub-rack level or allows its display colors to be changed so as to make the point of the failure visually understood. When a plurality of apparatus failures occur, the windows displaying a plurality of the mounting drawings of the sub-rack level are opened on the screen in the number necessary for display of the failures and the points of the failures are displayed in the window by using the mounting drawing of each sub-rack.

As mentioned above, the conventional monitor and control system has the problem that when the apparatus configurations of the monitored apparatuses are different in stations, the generated configuration information is changed and managed for every station in the monitor and control terminal to be connected to each monitored apparatus, therefore, the development of the monitor and control terminal takes a great deal of time. It also has a drawback that once the configuration information is determined, the monitor and control terminal cannot connect to the monitored apparatus which has the different apparatus configuration.

In the conventional monitor and control system, the history of operations and the history of recovery of error generation in each monitored apparatus, the history of operations in the monitor and control apparatus, and the like are displayed as the character data items on the screen, other than a screen displaying the latest state. Therefore, the operator need to read the data while tracing back the character data items listed in the order of time. Further, it is difficult to immediately obtain the information about whether any changes in condition have happened to the apparatus or not while the operator is absent, what they were if they have happened and at what timing they have happened and transferred to the present condition.

When the conventional monitor and control system reads the generated condition of a plurality of failures that generate almost simultaneously at each monitored apparatus and that have different severities on different sub-racks, a window displaying the failure having a low severity may be displayed on a window displaying the failure having a high severity since the monitor and control terminal displays the windows in the order of the reading process, and thus, the operator cannot easily understand that a failure having a higher severity has occurred. In addition, in a case where a plurality of failures having different severities have happened almost simultaneously at the different sub-racks, if the monitored apparatus first informs a failure which has happened at a certain subrack with a high severity and then a failure which has happened at a different sub-rack with a lower severity, the monitor and control terminal first displays the window having a higher severity which it has first received and then displays the window having a lower severity which it has received secondly on the displayed window having a higher severity, and thus, the operator cannot easily understand the occurrence of the failure having a higher severity.

BRIEF SUMMARY OF THE INVENTION

The present invention is accomplished in consideration of the above circumstances, and its object is to provide an access management method capable of limiting access of a monitor and control apparatus to a communications apparatus, and the communications apparatus.

Another object of the present invention is to provide a monitor and control system capable of flexibly responding to differences in apparatus configuration of monitored apparatuses and certainly monitoring failures, by reading configuration information from the monitored apparatuses, and by generating and displaying summary screens of the monitored apparatuses on the basis of the configuration information.

The other object of the present invention is to provide monitor and control system capable of easily obtaining various kinds of history information and information about state variations in the apparatuses, by displaying the state variations in the monitored apparatuses on the same screen as a monitoring screen to be displayed when the state variations are detected.

Yet another object of the present invention is to provide a monitor and control system allowing an operator to easily recognize that a failure with a higher severity is occurring.

The present invention provides a management method of an access from a monitor and control apparatus to communications apparatuses, in a network system comprising a plurality of communications apparatuses forming a network and a monitor and control apparatus for monitoring and controlling the network. The access management method comprises: a first step of obtaining identification information of the monitor and control apparatus requesting the access when a request for access from the monitor and control apparatus to the communications apparatuses is generated; a second step of searching for a first table in which a level of the monitor and control apparatus corresponds preliminarily to the identification information of the monitor and control apparatus, by using the identification information obtained at the first step as a key, and for obtaining the level of the monitor and control apparatus requesting the access; a third step of extracting a control function which the monitor ad control apparatus requests, and an operation type for the control function, from a request message received from the monitor and control apparatus; and a fourth step of searching a second table in which a permitted level of the monitor and control apparatus preliminarily corresponds to each of types of operations executed for the control function, by using the control function and the operation type obtained at the third step and the level of the monitor and control apparatus obtained at the third step as keys, and for determining permission of the request for access.

The first step preferably includes a step of obtaining the identification information of the monitor and control apparatus requesting the access, from information used when the communications apparatus establishes a communication connection with the monitor and control apparatus requesting the access or from the request message.

The plurality of communications apparatuses are preferably connected in a shape of a ring via a transmission connection to form a ring network.

According to the present invention, a communications apparatus, in a network system comprising a plurality of communications apparatuses for forming a network and a monitor and control apparatus for monitoring and controlling the network, is provided. The communications apparatus comprises: identification means for obtaining identification information of the monitor and control apparatus requesting an access when a request for access from the monitor and control apparatus to its own apparatus is generated; first storage means for storing a first table in which a level of the monitor and control apparatus corresponds preliminarily to the identification information of the monitor and control apparatus; level determination means for searching for the first table by using the identification information obtained by the identification means as a key and for obtaining the level of the monitor and control apparatus requesting the access; extraction means for extracting control functions requested by the monitor and control apparatus and types of operations for the control function, from a request message received from the monitor and control apparatus; second storage means for storing a second table in which a permitted level of the monitor and control apparatus corresponds preliminarily to each of types of operations executed for the respective control functions; and access determination means for searching for the second table by using the control functions and the operation types extracted by the extraction means, and the level of the monitor and control apparatus obtained by the level determination means, as keys, and for determining whether the access request can be permitted or not.

The identification means preferably obtains the identification information of the monitor and control apparatus requesting the access, from information used to establish a communication connection to the monitor and control apparatus requesting the access or from the request message.

In the present invention, when a monitor and control apparatus in the network requests an access to a communications apparatus, identification information of the monitor and control apparatus is fist obtained in the communications apparatus, and the level of the monitor and control apparatus corresponding to identification information is determined. The first table is stored preliminarily in each of communications apparatus in which the levels of the monitor and control apparatuses are defined as seen from each of the communications apparatuses such that the monitor and control apparatus of the same communications carrier has a higher level and that of the other communications carriers has a lower level, and the level determination is executed on the basis of the first table.

On the other hand, the function of the communications apparatuses to which the monitor and control apparatus requests for accessing, and the operation type for the function are extracted from the access request received by the communications apparatus. The second table is stored preliminarily in each of the communications apparatus in which permission of the operation is defined in connection with each function, in every level of the monitor and control apparatus. Finally, the permission of the transmitted access request is determined on the basis of the second table, by employing the determined level, and the extracted function and its operation type as the keys.

That is, the information items respectively representing (a) the monitor and control apparatus requesting an access; (b) the requested function; and (c) the requested operation, are obtained, and permission of the transmitted access request is determined in accordance with these information items.

With this function, the communications apparatus can permit access from the monitor and control apparatus of each communications carrier to the function which needs to be executed commonly to a plurality of communications carriers, and can also permit access from the only monitor and control apparatus of a specific communications carrier, to the functions peculiar to the respective communications carriers, but reject access from the other monitor and control apparatuses thereto.

According to another viewpoint of the present invention, a monitor and control system comprising a network constituted by a plurality of monitored apparatus, and one or more of monitor and control terminals for monitoring and controlling the respective monitored apparatuses, is provided. Each of the monitored apparatuses in this monitor and control system comprises means for detecting an apparatus configuration and supplying configuration information, and means for transmitting the configuration information to the monitor and control terminals. Each of the monitor and control terminals comprises means for receiving the configuration information from the monitored apparatus, and means for displaying a summary screen of the monitored apparatus on the basis of the received configuration information.

That is, in the present invention, the monitored apparatus detects the apparatus configuration such as expansion of racks and shelves by employing, for example, DIP switches, generates the configuration information representing the apparatus configuration, and transmits the configuration information to the monitor and control terminal. The monitor and control terminal displays the summary screen of the monitored apparatus on the basis of the configuration information. As explained above, since the summary screen is generated on the basis of the information representing the apparatus configuration, obtained from the monitored apparatus, the summary screen can be easily changed in accordance with the apparatus configuration of the monitored apparatus, and monitoring and controlling can be executed by connecting the terminal to the monitored apparatuses having different apparatus configurations.

According to the other viewpoint of the present invention, a monitor and control system comprising a network constituted by a plurality of monitored apparatus, and one or more of monitor and control terminals for monitoring and controlling the respective monitored apparatuses, is provided. Each of the monitored apparatuses in the monitor and control system comprises: means for collecting state history data; and means for transmitting the state history data to the monitor and control terminals. Each of the monitor and control terminals comprises: means for receiving the state history data from the monitored apparatus at any time or at any time interval; means for detecting data meeting preset conditions from the received state history data; means for generating and managing a screen representing a state of the monitored apparatus in accordance with the detected state history data; and means for displaying a plurality of screens managed by the managing means together with latest screens, in any order.

Further, according to the other viewpoint of the present invention, a monitor and control system comprising a network constituted by a plurality of monitored apparatus, and one or more of monitor and control terminals for monitoring and controlling the respective monitored apparatuses, is provided. Each of the monitor and control terminals in the monitor and control system comprises: means for reading information about states of one or more of failures occurring in the monitored apparatuses, via communication means; means for comparing severities in a plurality of failures read from the respective monitored apparatuses with one another and determining order of priority for the window display; means for displaying winds so that a window of higher priority overlaps on a window of lower priority in accordance with the determined order of priority in the window display.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a view showing contents of a level determination table 41;

FIG. 5 is a view showing contents of an access determination table 42;

FIG. 6 is a view showing contents of an associating table 62;

FIG. 17 is a view showing an example of a summary screen generated automatically by a monitor and control terminal on the basis of the configuration information corresponding to the apparatus configuration;

FIG. 22 is a view specifically showing configuration of inner data of a history data storage section 152;

DETAILED DESCRIPTION OF THE INVENTION

A first embodiment of the present invention will be described below in detail with reference to the drawings.

Figure 1:
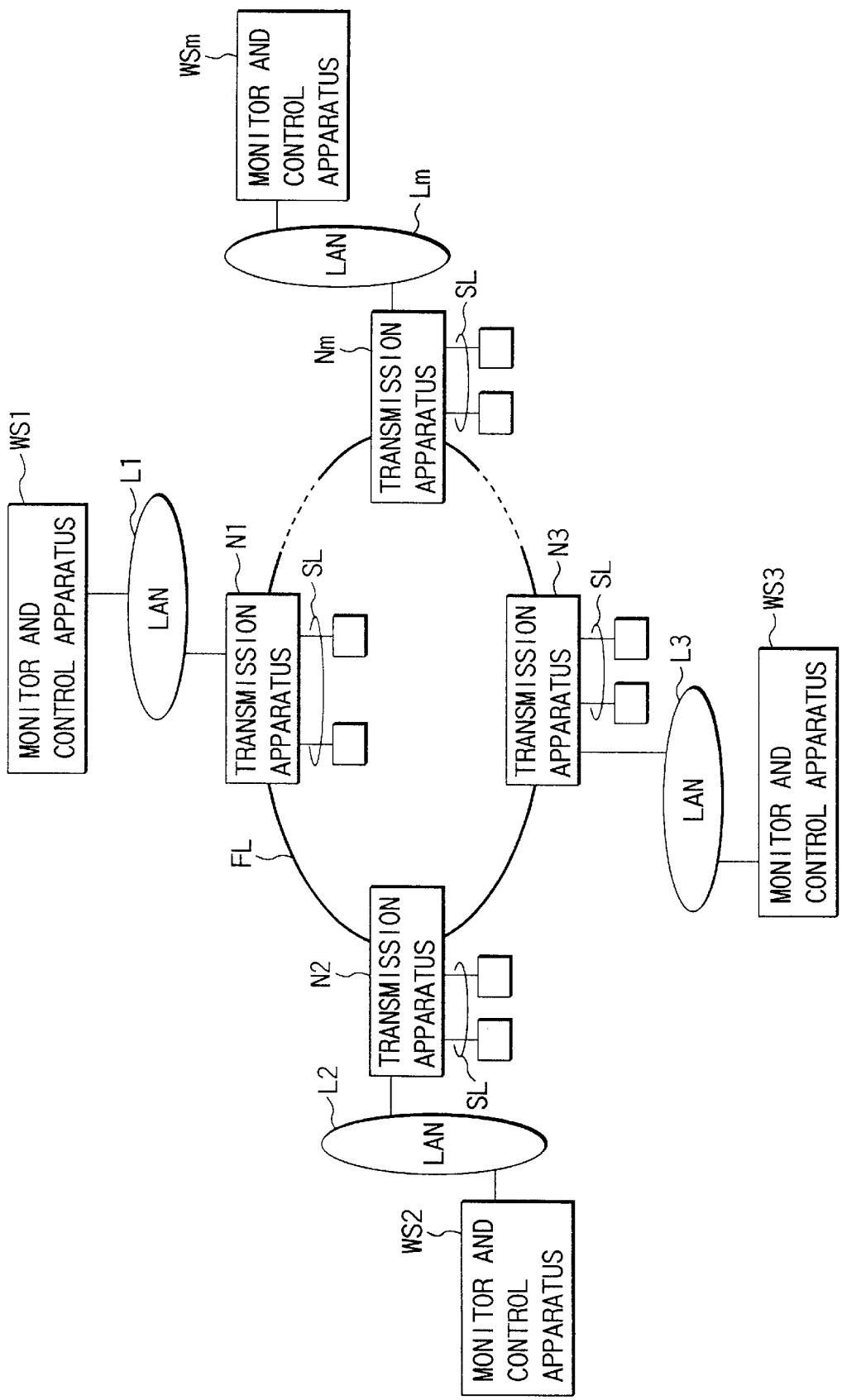
FIG. 1 is a view showing an actual configuration of an information communications system according to an embodiment of the present invention.

FIG. 1 shows a configuration of an information communications system according to the first embodiment of the present invention. The present embodiment is based on a ring network, in accordance with the SDH, in which m number of transmission apparatuses N1 to Nm serving as communications apparatuses are connected in a shape of a ring through a high-speed line FL such as an STM-16 line. The information of any channel in the information transmitted in the high-speed line FL, is dropped in a low-speed line SL by the transmission apparatuses N1 to Nm and transmitted to communications apparatuses such as exchanges.

Monitor and control apparatuses WS1 to WSm are connected to the transmission apparatuses N1 to Nm through Local Area Network (LAN) L1 to Lm, respectively. These monitor and control apparatuses WS1 to WSm are implemented as, for example, widely used workstations to monitor the conditions of the high-speed line FL and execute various types of setting for the transmission apparatuses N1 to Nm.

Figure 2:
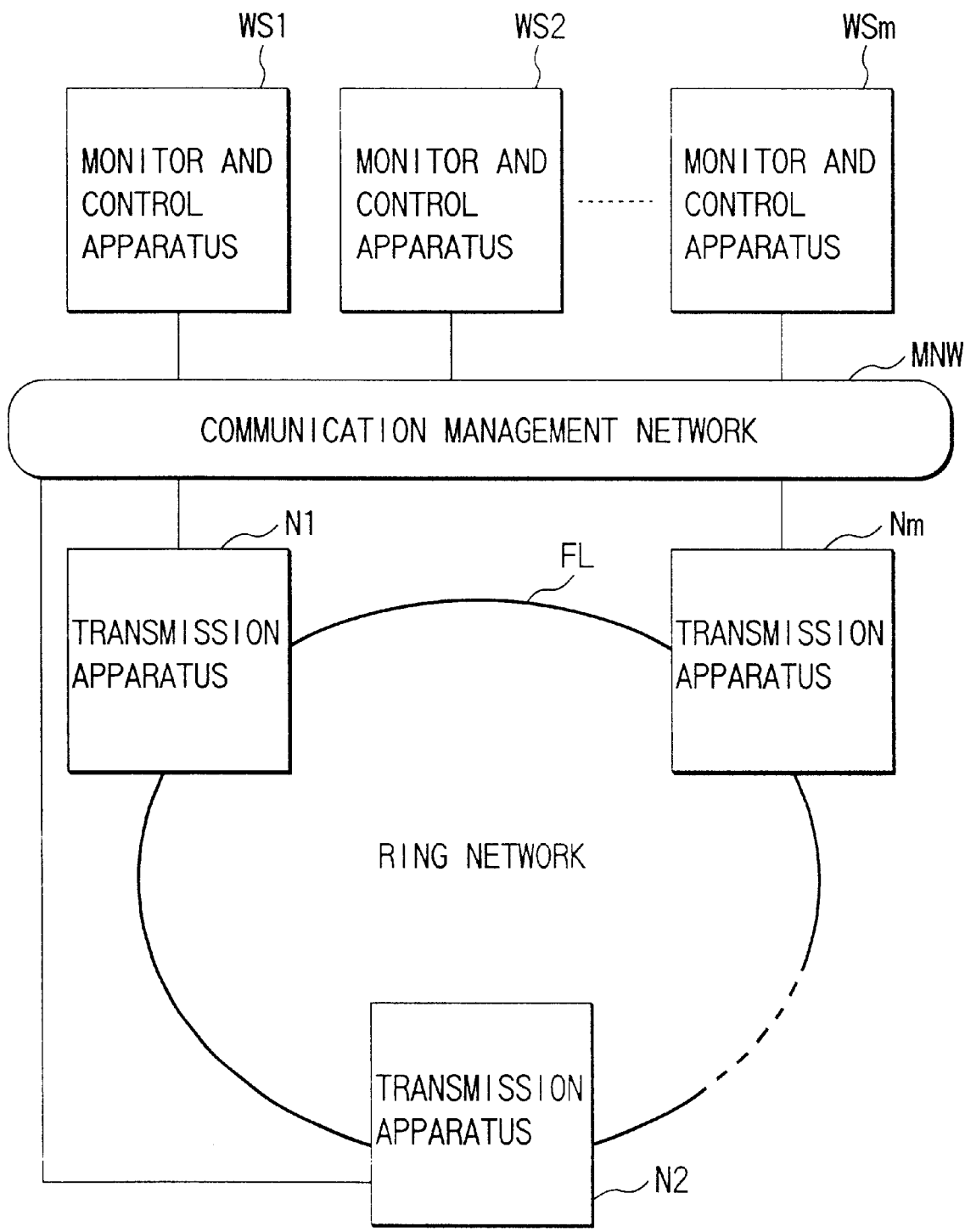
FIG. 2 is a view showing a logical configuration of the information communications system according to the embodiment of the present invention.

FIG. 2 shows a logical configuration of the information communications system according to the present embodiment. A communication management network MNW for making transmission and reception of various types of the control information between the monitor and control apparatuses WS1 to WSm and the transmission apparatuses N1 to Nm is formed therebetween. The communication management network MNW may be multiplexed in the high-speed line FL or formed in a line other than the high-speed line FL.

Figure 3:
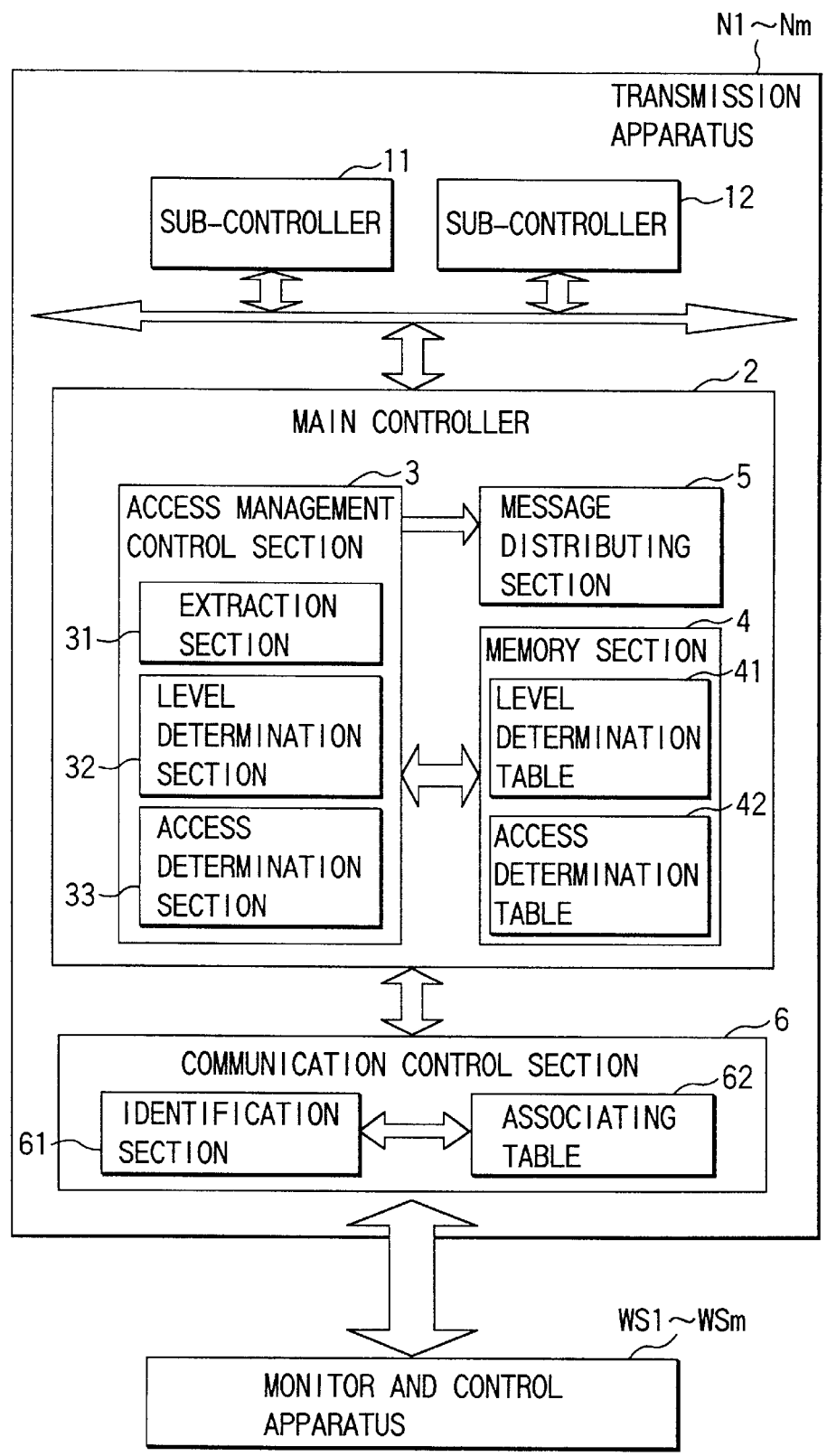
FIG. 3 is a view showing major elements of transmission apparatuses N1—Nm according to the embodiment of the present invention.

FIG. 3 shows a configuration of main parts of the transmission apparatuses N1 to Nm according to the present embodiment. Each of the transmission apparatuses N1 to Nm comprises a communication control apparatus 6 for controlling the communications with the monitor and control apparatuses WS1 to WSm and other transmission apparatuses, sub-controllers 11 and 12 each assigned with functions such as the setting of a communication connection and the detection of an alarm, and a main controller 2.

The main controller 2 comprises an access management and control section 3, a memory section 4 for storing various types of data and programs concerning the management and control of the access management and control section 3, and a message distributing means 5, in order to manage an access of the monitor and control apparatuses WS1 to WSm to the sub-controllers 11 and 12.

The access management and control section 3 comprises an extraction section 31, a level determination section 32, and an access determination section 33. The memory section 4 stores in advance a level determination table 41 and an access determination table 42.

On the level determination table 41, the levels of predetermined monitor and control apparatuses correspond respectively to identification names (ID) of the monitor and control apparatuses arranged at various areas of the world, as shown in FIG. 4. On the access determination table 42, functions (FUNCTION 1 OF INTEREST, FUNCTION 2 OF INTEREST, . . . ) of each monitor and control apparatus correspond to the levels of the monitor and control apparatus permitting an access, for every type of operations (GET, SET, . . . ) of the functions, as shown in FIG. 5. That is, it is determined in advance which level of the monitor and control apparatus should be permitted in every combination of the functions to be accessed and the types of the operations.

The extraction section 31 in the access management and control section 3 extracts a function of the monitor and control apparatus requesting the access, and the type of the operation for the function, from the received request message. The access request function is, for example, a function such as management of the communication connection, implemented by each of the sub-controllers 11 and 12, and the type of the operation is the setting for the communication connection.

The level determination section 32 searches for the level determination table 41 by using, as a key, the identification information of the monitor and control apparatus requesting the access, which is obtained from an identification section 61 to be described later, and determines the level of the monitor and control apparatus requesting the access. The access determination section 33 searches for the access determination table 42 by using, as keys, the access requesting function of the monitor and control apparatus requesting the access and the type of the operation corresponding to this function, which are obtained by the extraction section 31, and the level of the monitor and control apparatus which is obtained by the level determination section 32, and determines whether the transmitted request for access should be permitted or not.

The message distributing section 5 makes the subcontroller, which is to implement the control function of the requester, implement the function when the requested access is permitted.

The communication control section 6 comprises an identification section 61 and an associating table 62. When the identification section 61 receives the request of any of the monitor and control apparatuses WS1 to WSm to make an access to its apparatus, the identification section 61 identifies the monitor and control apparatus in accordance with the information used when the communication connection with the monitor and control apparatus requesting the access is established or with the request message. As for the information used at the establishment of the communication connection with the monitor and control apparatus requesting the access, a file descriptor for identifying a stream can be used.

The associating table 62 associates a file descriptor used at the establishment of the communication connection with the monitor and control apparatus with an identification name (ID) of the monitor and control apparatus which is obtained by the identification section 61, and records the relationship as a table style, as shown in FIG. 6. The recording contents of the associating table 62 are dynamically renewed (added, deleted). When the communication connection with a plurality of monitor and control apparatuses is established, the file descriptors used for the respective monitor and control apparatuses can be made different by opening different streams for respective monitor and control apparatuses.

The extraction section 31, the level determination section 32, the access determination section 33, the message distributing section 5 and the identification section 6 are implemented by executing the software program stored in the storage medium such as a semiconductor memory by use of a CPU included in the main controller. The level determination table 41, the access determination table 42 and the associating table 62 are stored in a rewritable Random Access Memory (RAM) such as an Static Random Access Memory (SRAM) and a flash memory (flash EEPROM: Flash Electrically Erasable Programmable Read Only Memory).

Next, steps of the process in the access management control section 3 according to the present embodiment will be explained, after the flow of the message in the above configuration is explained with reference to a message flow diagram of FIG. 7.

Figure 7:
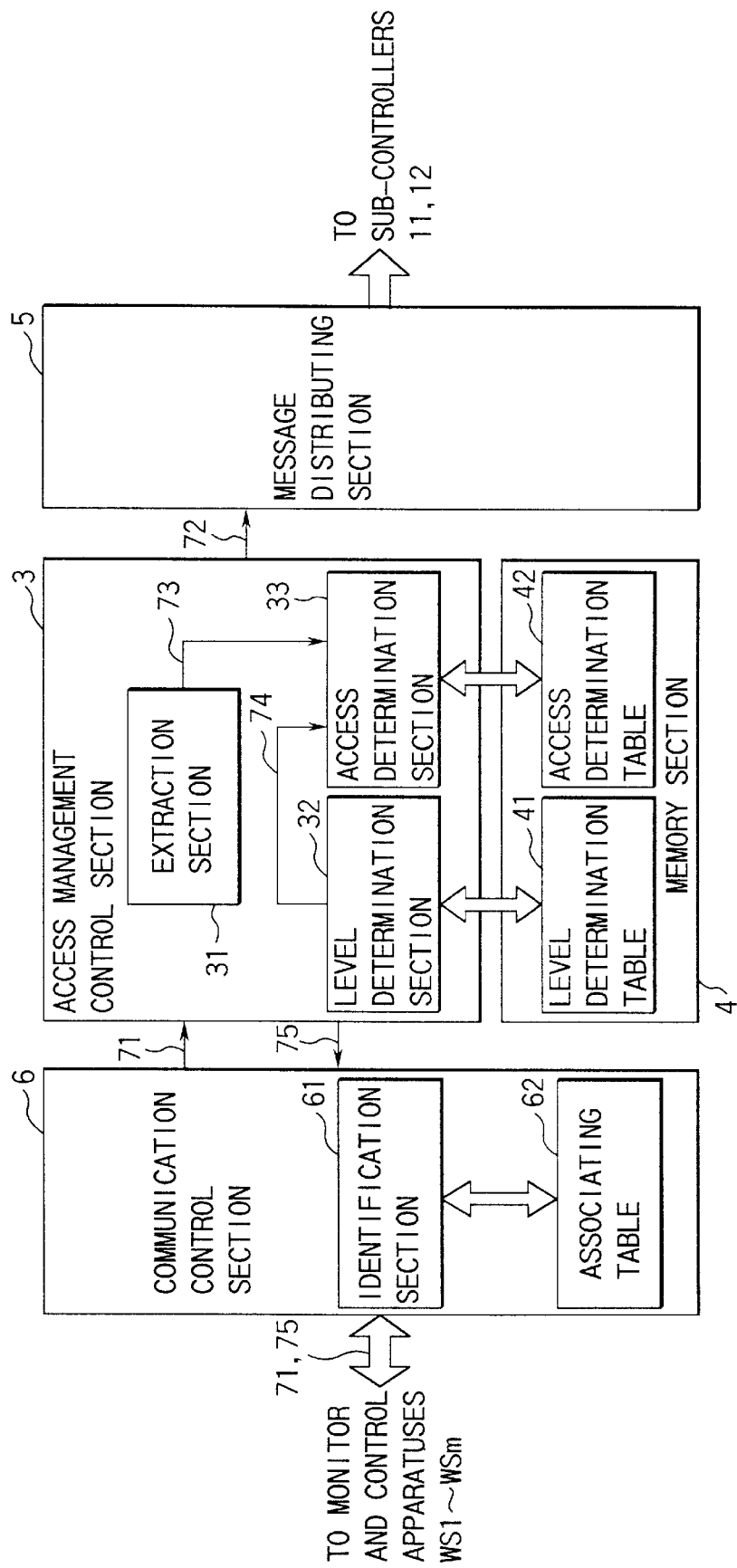
FIG. 7 is a view showing message flow in an access management process steps according to the embodiment of the present invention.

In FIG. 7, requester information is added to a request message 71 transmitted from the monitor and control apparatuses WS1 to WSm by the identification section 61 of the communication control section 6. The request message 71 is forwarded to the access management control section 3 as a request message 72. In the access management control section 3, the level determination section 32 determines the level of the monitor and control apparatus by referring to the level determination table 41, in accordance with the requester information which it has obtained, and forwards a result of the determination 74 to the access determination section 74. The extraction section 31 extracts information 73 representing the function to be accessed and a type of the operation and transmits the information 73 to the access determination section 33.

The access determination section 33 refers to the access determination table 42 in accordance with these information items and determines the permission/non-permission of the request for access. When the access determination section 33 determines that the request for access is not permitted, a response of rejection 75 is transmitted to the communication control section 6 and is sent back to the monitor and control apparatus which has made the request for access. Only the request message 72 from the monitor and control apparatus which has been permitted to make an access is transmitted to the message distributing section 5 and is transferred to the sub-controller (11 or 12).

The process steps of identifying the monitor and control apparatus in the above-mentioned configuration will be explained with reference to the flow chart of FIG. 8.

Figure 8:
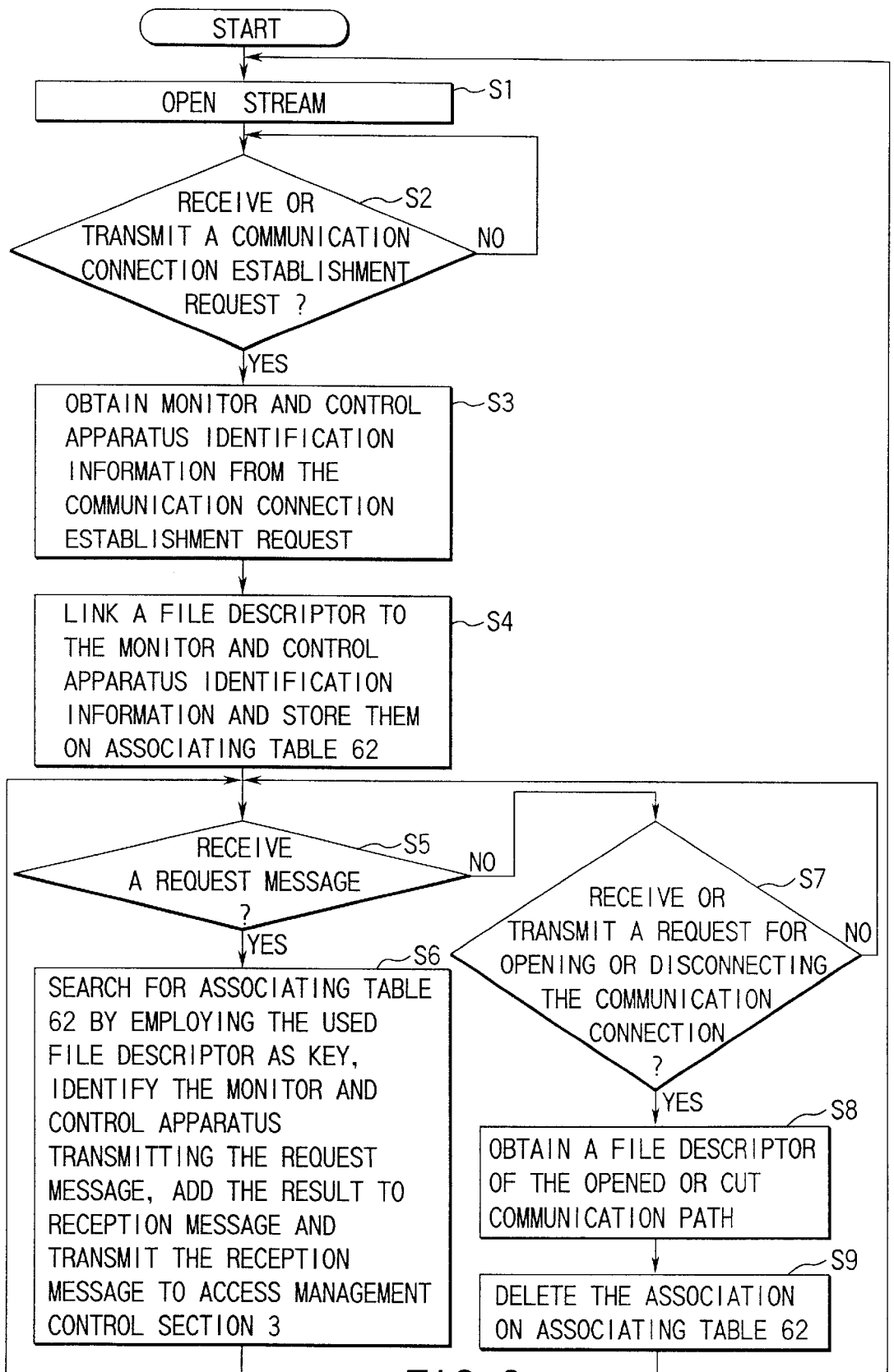
FIG. 8 is a flow chart showing process steps of identifying a monitor and control apparatus that has transmitted a request of operation to a transmission apparatus, according to the embodiment of the present invention.

At step S1 of FIG. 8, the identification section 61 opens a stream between itself and the process of implementing the communication protocol. At step S2, transmission and reception of the request for establishment of the communication connection is monitored. When it is determined that the request for establishment of the communication connection has been received or transmitted (YES), the identification section 61 obtains the identification information of the monitor and control apparatus in accordance with the request for establishment of the communication connection, at step S3.

Each opened stream can be identified by a file descriptor. At step S4, the identification section 61 associates the monitor and control apparatus identification information with the file descriptor and makes the associating table 62 hold the information.

The identification section 61 proceeds to Step S5 to determine whether the request message transmitted from the monitor and control apparatus has been received or not. When the identification section 61 determines the reception of the request message (YES), the identification section 61 proceeds to Step S6, searches for the associating table 62 by using as a key the file descriptor used when the request message has been received, identifies the monitor and control apparatus which has transmitted the request message, adds the result of the search to the reception message and forwards the reception message to the access management control section 3.

When the request message is not received (NO) at step S5, the identification section 61 proceeds to step S7 to determine the transmission and reception of the request for opening or disconnecting the communication connection. When the request message is transmitted or received (YES), the identification section 61 obtains the file descriptor of the communication connection at step S8, and deletes the association of the file descriptor with the identification information from the associating table 62 at step S9. When the request is not transmitted or received (NO) at step S7, the control proceeds to step S5.

Next, the control steps of extracting the accessing function and the type of the operation corresponding to the function, in the access management control section 3, will be explained. In the following explanation, a method of extracting the accessing function and the type of operation thereof from the request message employing the Common Management Information Protocol (CMIP) according to a standard type of the management information structure of the Open System Interconnection (OSI) will be exemplified.

Figure 9A:
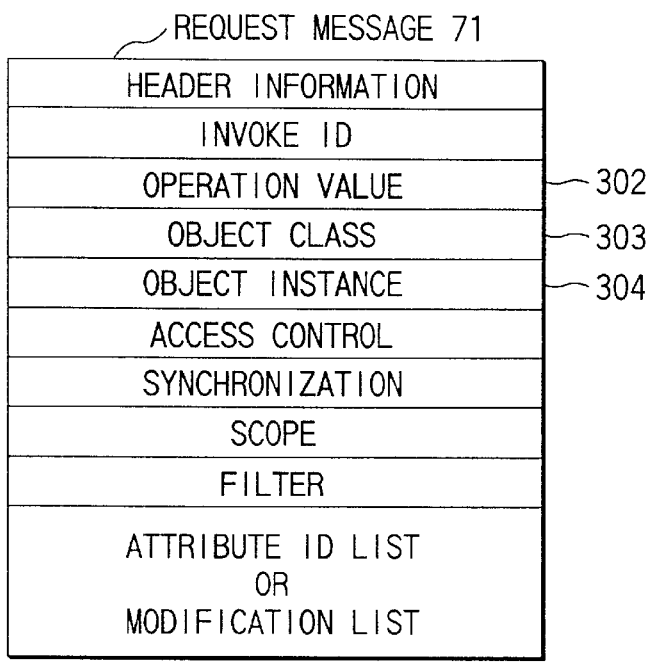
FIGS. 9A and 9B are views showing an example of a request message structure in CMIP.
Figure 9B:
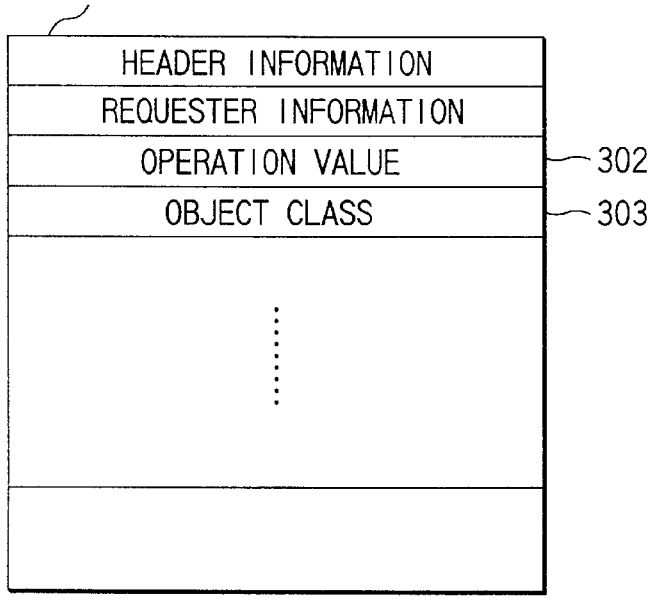

FIG. 9A shows an example of the request message structure based on the CMIP. Each of operations (GET, SET, CREATE, DELETE, ACTION) defined in the CMIP has the common structure, from the header information to the object instance shown in FIG. 9A. A format of the request message 72 to which the requester information is added, forwarded from the identification section 61 to the access management control section 3, can be conceived as shown in, for example, FIG. 9B.

Figure 10:
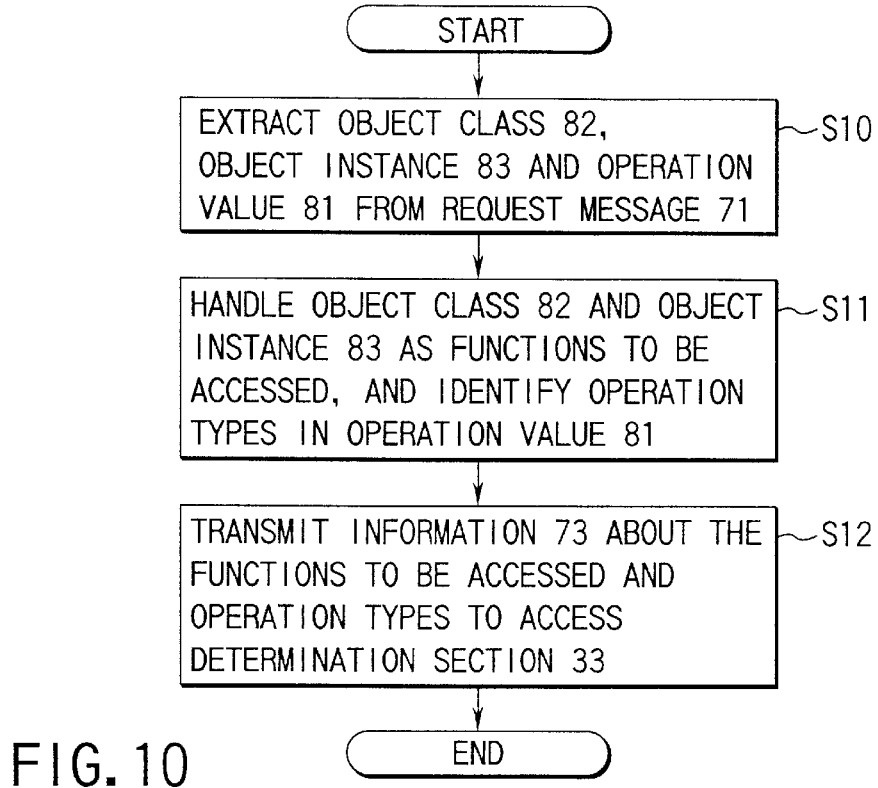
FIG. 10 is a flow chart showing process steps of extracting an accessing function and an operation type for the function, according to the embodiment of the present invention.

In a flow chart of FIG. 10, the extraction section 31 extracts an object class 82, an object instance 83 and an operation value 81, from the request message 71 transmitted from the communication control section 6, at step S10.

At step S11, the extraction section 31 handles the object class 82 and the object instance 83 as the functions to be accessed, and identifies the type of operation out of the operation value 81.

At step S12, the extraction section 31 forwards the information 73 representing the obtained functions to be accessed and the type of operation to the access determination section 33.

Figure 11:
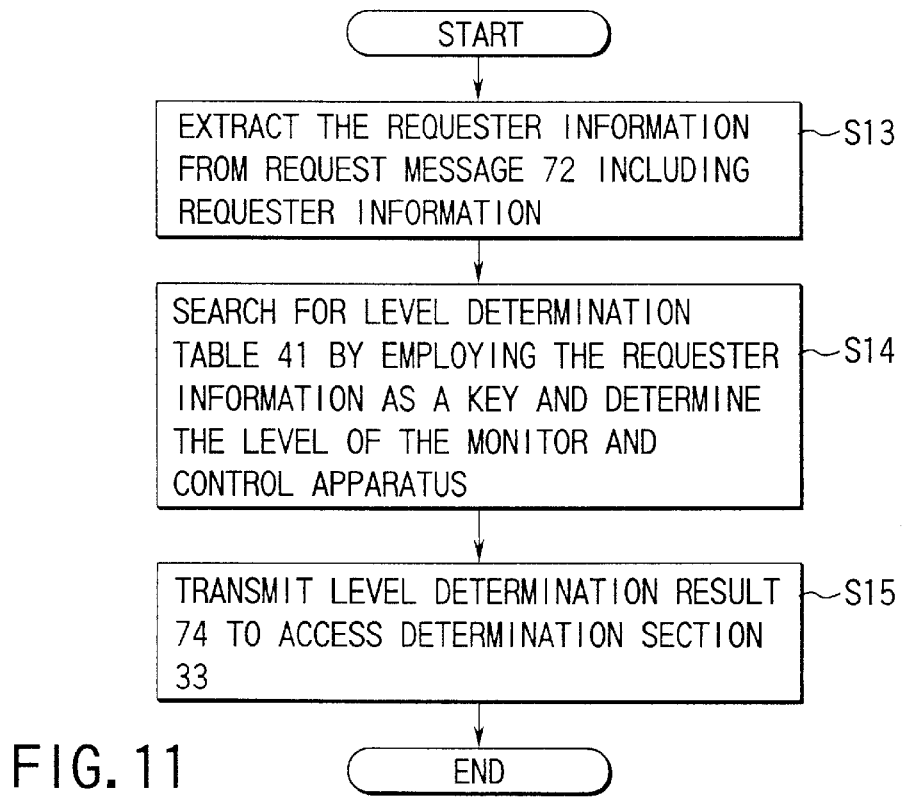
FIG. 11 is a flow chart showing process steps of determining a level of the monitor and control apparatus which requests an access, according to the embodiment of the present invention.

Next, the control steps of determining the level of the monitor and control apparatus which requests the access, in the access management control section 3, will be explained with reference to a flow chart of FIG. 11. The level determination section 32 extracts the information representing the monitor and control apparatus requesting the access, from the request message 72 at step S13 of FIG. 11.

At step S14, the level determination section 32 searches for the level determination table 41 by using the received requester information as the key and determines the level of the monitor and control apparatus requesting the access, and forwards the level determination result 74 to the access determination section 33 at step S15.

Figure 12:
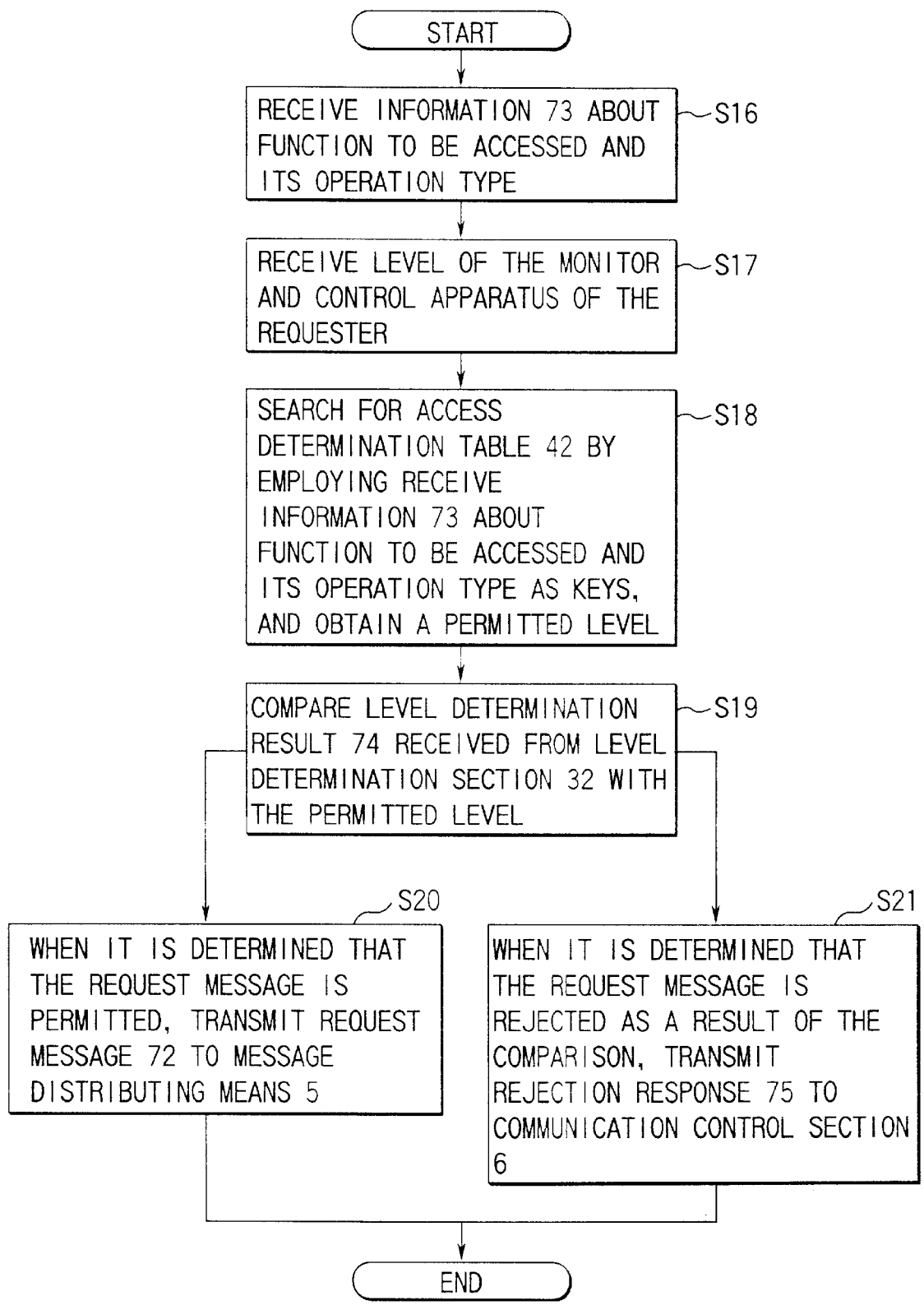
FIG. 12 is a flow chart showing process steps of determining whether the requested access is permitted or not, according to the embodiment of the present invention.

Next, steps of determining whether the requested access should be permitted or rejected, in the access management control section 3, will be explained with reference to a flow chart of FIG. 12. At step S16 of FIG. 12, the access determination section 33 receives the information 73 representing the functions to be accessed and the type of their operations, from the extraction section 31.

At step S17, the access determination section 33 receives the level determination result 74 of the monitor and control apparatus requesting the access from the level determination section 32.

At step S18, the access determination section 33 searches for the access determination table 42 by using the received information 73 representing the functions to be accessed and the type of their operations as keys, and obtains the permitted level.

At step S19, the access determination section 33 compares the level at which the access is permitted with the level of the monitor and control apparatus requesting the access, and determines "permission" when the level of the monitor and control apparatus requesting the access is included in the level at which the access is permitted or "rejection" when the level is not.

When the access determination section 33 determines the permission of the message requesting the access, the access determination section 33 forwards the received request message 72 to the message distributing section 5 at step S20. On the other hand, the access determination section 33, determining the rejection at step S19, forwards the rejection response 75 to the communication control section 6 and discards the received request message 72. The rejection response 75 is transmitted to the monitor and control apparatus which has transmitted the request message, via the communication control section 6.

The above process steps will be explained below. It is assumed that, for example, the identification information items of the respective monitor and control apparatuses WS1 to WSm are set to be Tokyo 1, Tokyo 2, Hong Kong 2, . . . as represented from the top in FIG. 4, the access determination table 42 of FIG. 5 is stored in the transmission apparatus N1 and the transmission apparatus N1 has received the request for access from the monitor and control apparatus WS1.

Figure 13:
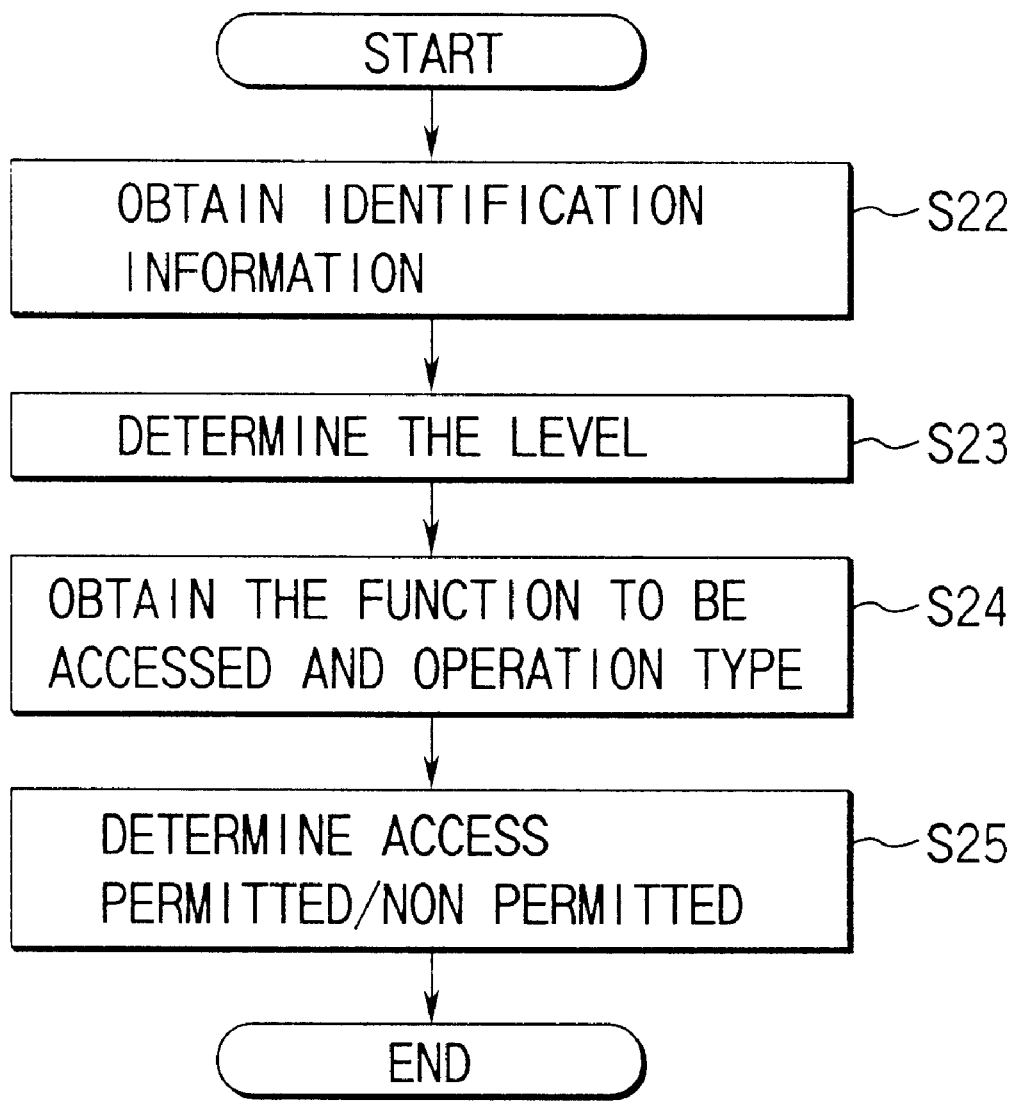
FIG. 13 is a flow chart explaining process steps in each of the transmission apparatuses N1—Nm, according to the embodiment of the present invention.

In the transmission apparatus N1, the identification information (Tokyo 1) of the monitor and control apparatus WS1 is obtained as shown in the flow chart of FIG. 13 (step S22). Subsequently, in the transmission apparatus N1, the level of the monitor and control apparatus WS1 is determined by referring to the level determination table 41 of FIG. 4 (step S23). Thus, the level is determined as "LEVEL 1".

Next, in the transmission apparatus N1, the type of the operation and the function to which the monitor and control apparatus WS1 requests to access are extracted (step S24). It is assumed here that the function 1 and the operation type ACTION, of the access determination table 42 of FIG. 5, are referred. Finally, in the transmission apparatus N1, the access determination table 42 is reviewed and the permission or the rejection of this access is determined (step S25).

On the access determination table 42, the ACTION command for the function 1 is permitted for the monitor and control apparatus of level 1 or 2. Therefore, the access from the monitor and control apparatus WS1 is permitted, the request for access is forwarded to the sub-controller (for example, sub-controller 11) implementing the function 1, and the ACTION command for the function 1 is executed.

Similarly, when the ACTION request of the monitor and control apparatus WS5 (identification name: San Fran 1) to the control function 1 is made, the request is permitted since the level of the monitor and control apparatus WS5 is two. On the other hand, when monitor and control apparatus WS2 (level 3) requests execution of the ACTION command for the function 1, this request is rejected since the access of the monitor and control apparatus of level 3 is not permitted on the access determination table 42.

As explained above, in the present embodiment, the identification information of the monitor and control apparatus requesting the access is obtained at each of the transmission apparatuses N1 to Nm and the uniquely determined level is determined for each of the monitor and control apparatuses WS1 to WSm. In addition, the function and the type of its operation to which the monitor and control apparatus requests to access are identified, after that, the permission or the rejection of the access is determined on the basis of a predetermined table.

Thus, the transmission apparatuses N1 to Nm permit the monitor and control apparatus of each communications carrier to make an access to the functions which a plurality of communications carriers need to carry out commonly, or permit only the monitor and control apparatus of a specific communications carrier to make an access to the function peculiar to each communications carrier and can thereby reject the access of the other monitor and control apparatuses.

In the above embodiment, the ring network in accordance with the SDH has been described. However, the present invention can be applied to the network of the other type.

Next, a second embodiment of the present invention will be described.

Figure 14:
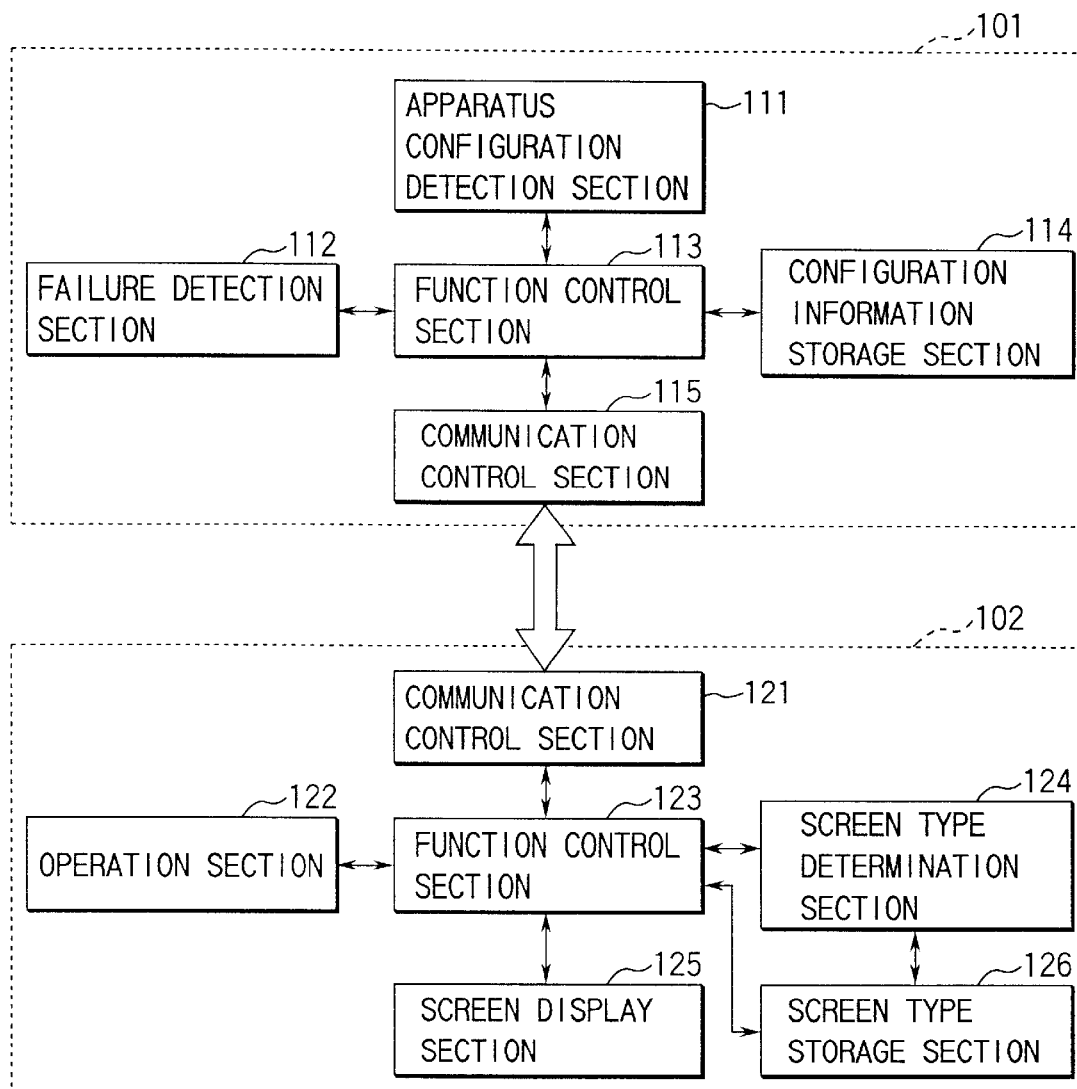
FIG. 14 is a block diagram showing a monitored apparatus and a monitor and control terminal in the optical transmission system, according to a second embodiment of the present invention.

FIG. 14 is a block diagram showing a monitored apparatus and a monitor and control terminal of the optical transmission system according to the second embodiment of the present invention. Reference numeral 101 denotes a monitored apparatus, and 102 is a monitor and control terminal. The monitored apparatus 101 is constituted by an apparatus configuration detection section 111, a failure detection section 112, a function control section 113, a configuration information storage section 114 and a communication control section 115. The monitor and control terminal 102 is constituted by a communication control section 121, an operation section 122, a function control section 123, a screen type determination section 124, a screen display section 125 and a screen type storage section 126.

Figures 15, 16:
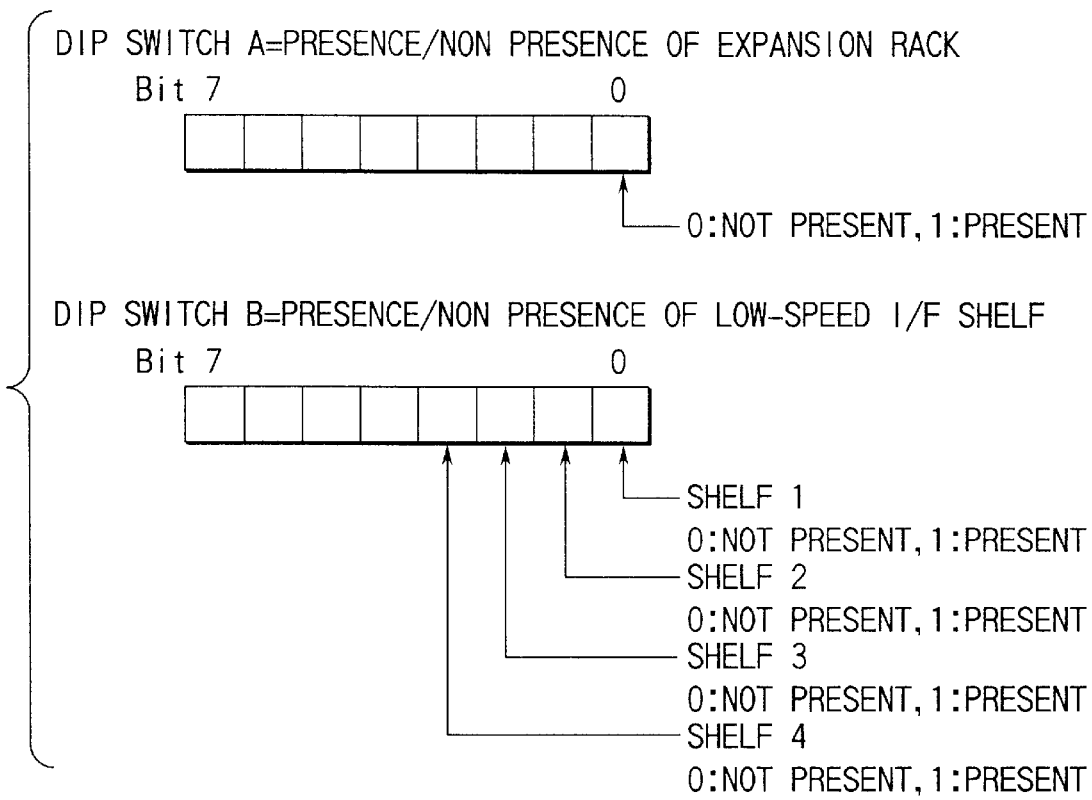
FIG. 15 is a view showing a DIP switch which an apparatus configuration detection section 111 of a monitored apparatus 101 detects.
FIG. 16 is a view showing a configuration information memory that a configuration information storage section 114 sets on the basis of the apparatus configuration information.

FIG. 15 shows DIP switches contained in the apparatus configuration detection section 111 of the monitored apparatus 101. DIP switch A can detect the presence or no presence of an expansion rack, and represents no expansion rack when bit 0 is 0 or the presence of the expansion rack when bit 0 is 1. DIP switch B can detect the presence or no presence of a low-speed I/F shelf. The bit 0 to bit 3 correspond respectively to shelf 1 to shelf 4. 0 represents no shelf, and 1 indicates the presence of the shelf. The apparatus configuration detection section 111 may be a manual switch of the DIP switch or a switch for automatically detecting the apparatus configuration.

FIG. 16 shows the configuration information storage section 114 which stores the information about the apparatus configuration. The configuration information storage section 114 includes memory A for storing the expansion rack information and memory B for storing the number of low-speed I/F shelves. The memory A stores the expansion for each expansion rack, i.e. stores 0 when there is no expansion or 1 when there is the expansion. The memory B stores the values of 1 to 4 for each rack as the information about the number of the low-speed I/F shelves.

FIG. 17 shows summary screens generated automatically by the monitor and control terminal 102 on the basis of the configuration information corresponding to the apparatus configuration. Type A is a basic configuration of the monitored apparatus 101, which is constituted by a COM shelf, a high-speed I/F shelf, and low-speed I/F shelves 1 and 2. FIG. 17 indicates that the apparatus configurations of four types B to F can be implemented by further addition of the shelf or expansion of the rack to this basic configuration. In types B and C, one or two low-speed I/F shelves are added, but there is no expansion rack. That is, totally three low-speed I/F shelves exist in type B, and totally four low-speed I/F shelves exist in type C. There is the expansion rack in types D and E. A low-speed I/F shelf 3 is added to the basic configuration in type D, and low-speed I/F shelves 3 and 4 are added thereto in type E.

Figure 18:
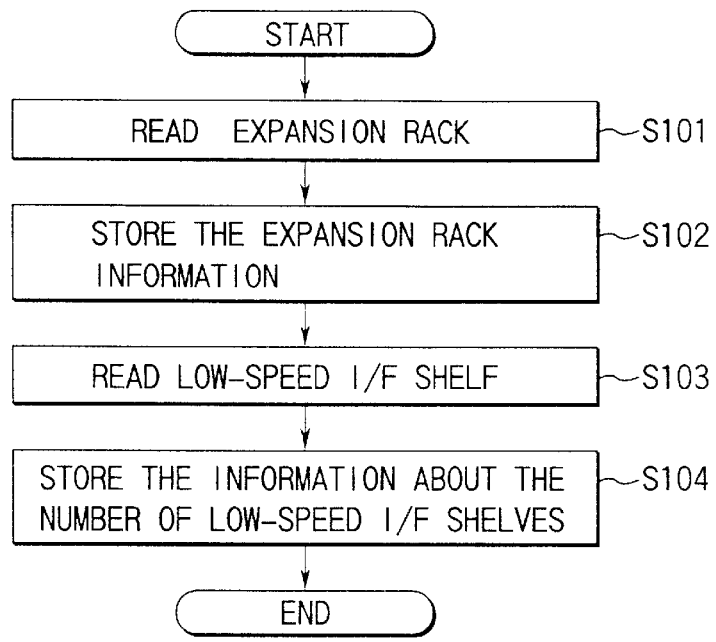
FIG. 18 is a flow chart explaining a method of setting the configuration information.

Operations of the above-mentioned configuration will be explained below. First, a method in which the monitored apparatus 101 makes the memory of the configuration information storage section 114 store the configuration information will be explained in accordance with a flow chart of FIG. 18. When the monitored apparatus 101 starts up, the apparatus configuration detection section 111 reads the information about the presence or no presence of the expansion rack from the DIP switch A and forwards the information to the function control section 113, in accordance with an instruction from the function control section 113 (step S101). The function control section 113 makes the memory A of the configuration information storage section 114 store the information (step S102). Similarly, the apparatus configuration detection section 111 reads the information about the presence or no presence of the low-speed I/F shelf from the DIP switch B and forwards the information to the function control section 113, in accordance with the instruction from the function control section 113 (step S103). The function control section 113 makes the memory B store the number of low-speed I/F shelves, on the basis of the information about the presence or no presence of the low-speed I/F shelf (step S104).

Figure 19:
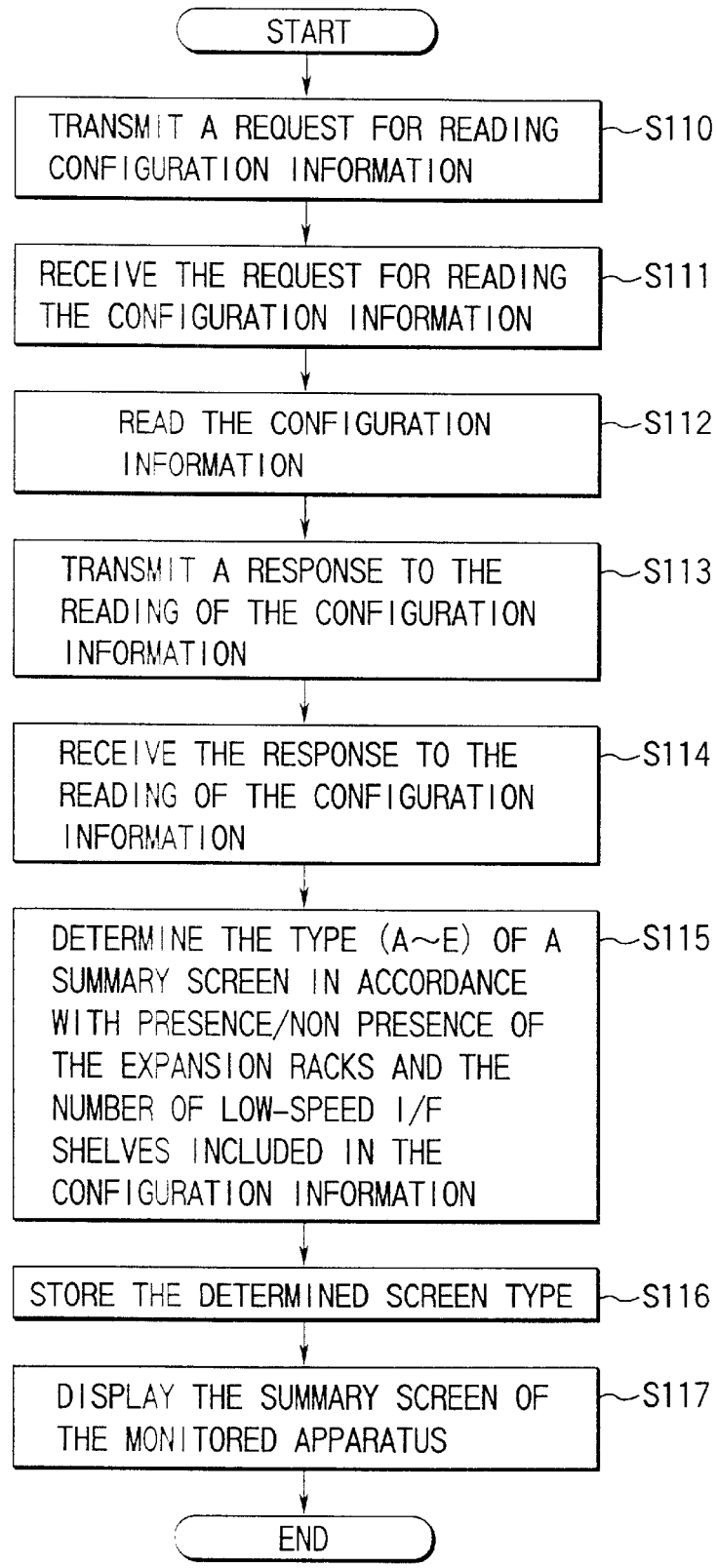
FIG. 19 is a flow chart explaining an automatic summary screen generating method based on the apparatus configuration, in a monitor and control terminal 102.

Next, a method of automatically generating summary screens by the monitor and control terminal 102 will be explained with reference to a flow chart of FIG. 19. When the monitor and control terminal 102 starts up by the operation section 122, the communication control section 121 transmits a request for reading the configuration information to the monitored apparatus 101 in accordance with the instruction from the function control section 123 (step S110). In the monitored apparatus 101, the communication control section 115 receives the request for reading the configuration information and forwards the request to the function control section 113 (step S111). The function control section 113 reads the configuration information from the configuration information storage section 114 in response to this request (step S112). The function control section 113 transmits the configuration information, as a configuration information read response, to the monitor and control terminal 102 through the communication control section 115 (step S113). In the monitor and control terminal 102, the function control section 123 receives the configuration information read response through the communication control section 121 and forwards this response to the screen type determination section 124 (step S114). The screen type determination section 124 reads the presence or no presence of the expansion rack and the number of low-speed I/F shelves from the configuration information read response and determines the type of the summary screen (one of types A to E) in accordance with the apparatus configuration (step S115). The screen type determination section 124 makes the screen type storage section 126 store the determined screen type (step S116). The function control section 123 reads the screen type from the screen type storage section 126, automatically generates the summary screen on the basis of this screen type and allows the summary screen of the monitored apparatus 101 to be displayed on the screen display section 125 (step S117).

Figure 20:
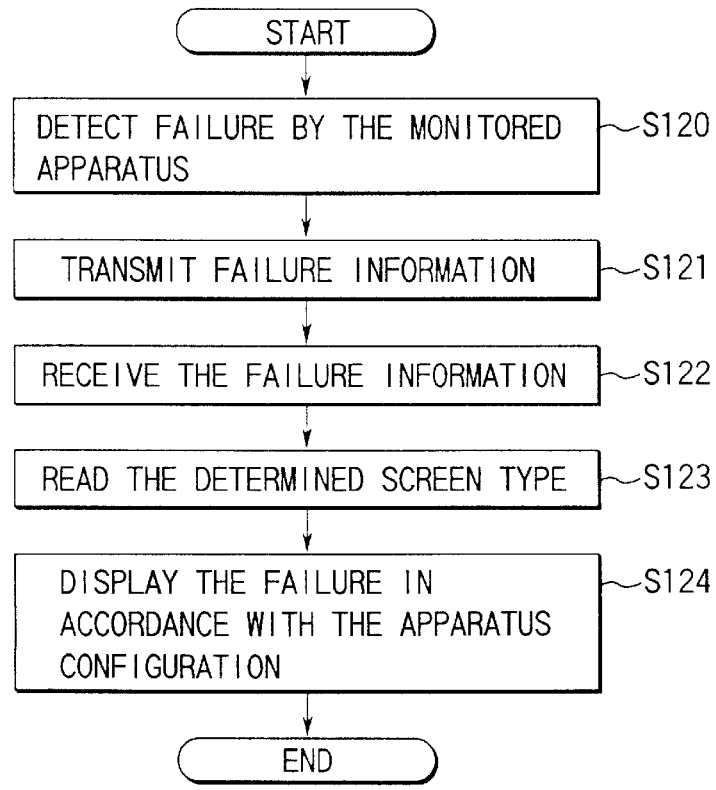
FIG. 20 is a flow chart showing steps of displaying a failure by the monitor and control terminal 102 when the failure is detected by the monitored apparatus 101.

Next, steps of displaying a failure by the monitor and control terminal 102 when the failure is detected in the monitored apparatus 101, will be explained below in accordance with a flow chart of FIG. 20. When the failure detection section 112 of the monitored apparatus 101 detects a failure such as a board fault (particularly in the low-speed I/F shelf 3 or 4), the failure detection section 112 forwards failure information to the function control section 113 (step S120). The function control section 113 transmits the failure information to the monitor and control terminal 102 through the communication control section 115 (step S121). In the monitor and control terminal 102, the communication control section 121 receives the failure information from the monitored apparatus 101 and forwards the failure information to the function control section 123 (step S122). The function control section 123 reads the screen type from the screen type storage section 126 (step S123). After that, the function control section 123 allows the summary screen and the failure information of the monitored apparatus 101 to be displayed on the screen display section 125, on the basis of the screen type and the failure information (step S124).

As explained above, in the present embodiment, the configuration information is read from the monitored apparatus and the summary screen is automatically generated in accordance with the configuration information. For this reason, monitoring and controlling can be executed by connecting the monitor and control terminal to any monitored apparatus having different apparatus configurations.

Next, a third embodiment of the present invention will be described below.

Figure 21:
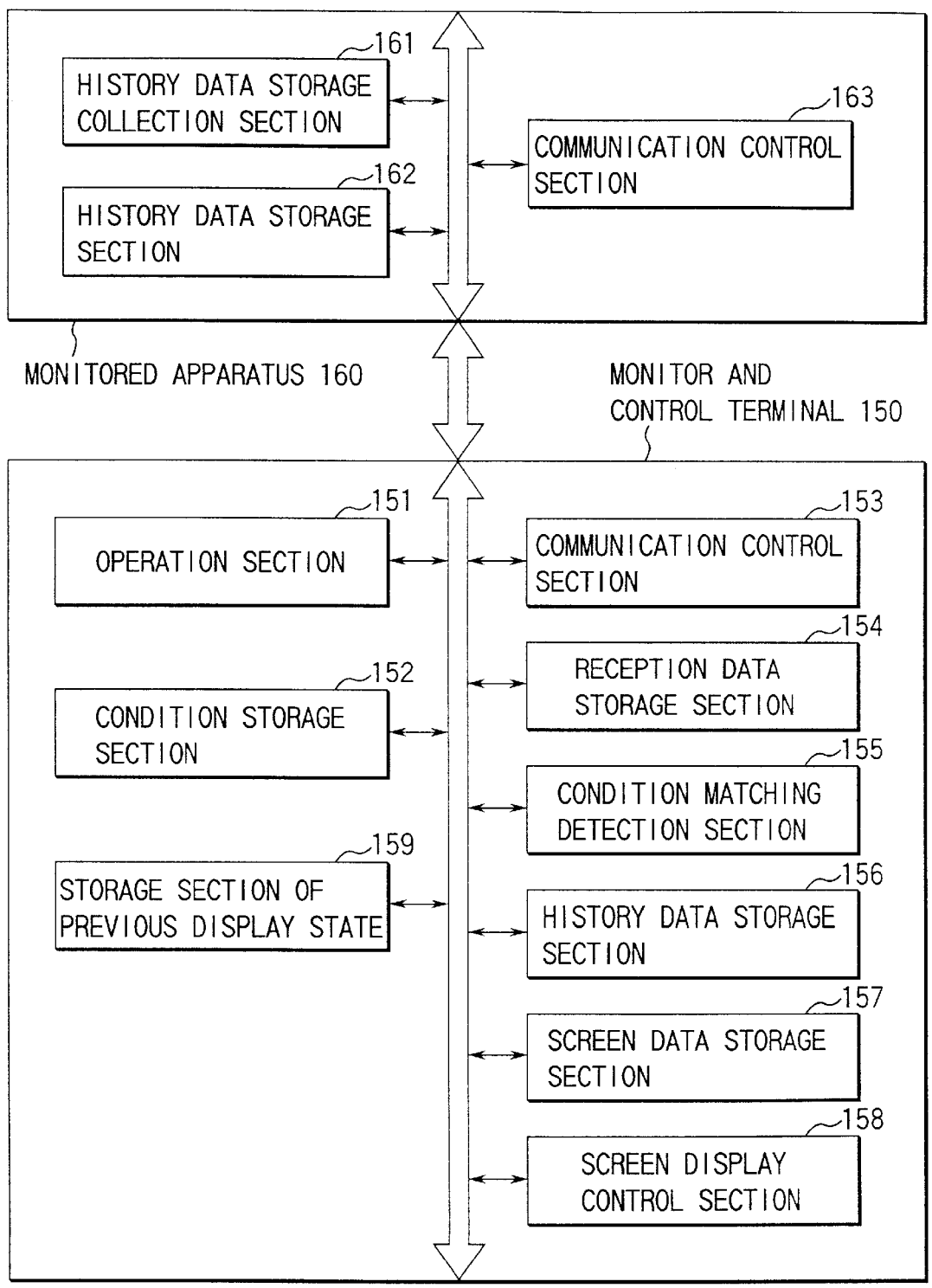
FIG. 21 is a block diagram showing functions of a third embodiment of the present invention.

FIG. 21 is a block diagram describing functions of the third embodiment of the present invention, which is constituted by a monitor and control terminal 150 and a monitored apparatus 160. The monitor and control terminal 150 is constituted by an operation section 151, a condition storage section 152, a communication control section 153, a reception data storage section 154, a condition matching detection section 155, a history data storage section 156, a screen data storage section 157, a screen display control section 158, and a display state storage section 159 for storing the display state at the previous operation. The monitored apparatus 160 is constituted by a history data collection section 161, a history data storage section 162 and a communication control section 163.

The operation section 151, constituted by, for example, a keyboard, a pointing device, operation buttons and the like, makes operations for the monitor and control terminal 150.

The condition storage section 152 stores the conditions for points of variations to be detected, which have been input from the operation section 151. The conditions for points of variations to be detected are points of state variations which need to be displayed on the monitor and control terminal 150, and are selected from various states that the state history data of the monitored apparatus 160 may place. In the exemplified embodiment, the states in which a Major alarm is varied are set as detection conditions.

The communication control section 153 receives the state history data from the communication control section 163 of the monitored apparatus 160 at any time or in any interval, and makes the reception data storage section 154 store the data. The state history data is collected by the data collection section 161 of the monitored apparatus 160 and is stored in the data storage section 162. When the monitor and control terminal 150 collects the state history data at any time, the data storage section 162 can be removed from the monitored apparatus 160.

The condition matching detection section 155 reads the reception data out of the reception data storage section 154 and detects whether the read data matches with the conditions stored in the condition storage section 152 or not. When the read data matches with the stored conditions, the condition matching detection section 155 makes the history data storage section 156 and the screen data storage section 157 store the information about the matching history data.

The screen data storage section 157 stores the screen which should be displayed, in an equal size, or in a reduced and compressed size. For example, the screen data storage section 157 stores the screen data in the bit map format. The screen display control section 158 allows the screen to be displayed on the display, on the basis of the data stored in the reception data storage section 154, the history data storage section 156 and the screen data storage section 157.

The storage section 159 is provided optionally to store the conditions which are input from the operation section 151 at the previous operation. For example, the storage section 159 may be constituted to store previous conditions every time new conditions are stored in the condition storage section 152. Thus, when the storage section 159 is provided, a terminal which is not always connected to the monitored apparatus can recognize the difference to the current condition by displaying the previous information.

FIG. 22 specifically shows the data structure stored in the history data storage section 156, and the data structure is called a storage data table. History screen number Dx (where x=1 . . . N; N is a maximum value) represents the number of the stored history screen, and Dx represents an x-th history screen. Major alarm variation detection information, ON date/time, and OFF date/time are the information items extracted from the history data detected by the condition matching detection section 155. The Major alarm variation detection information represents that various Major alarms are turned on or off. The ON date/time represents the date and time at which the Major alarms are turned on. The OFF date/time represents the date and time at which the Major alarms are turned off. "*" indicates that the alarm of X on the history screen No. Dl is changed from the ON state (generation) to the OFF state (release). The address of the screen data represents a top address of each screen data items stored in the screen data storage section 157. For example, the history screen D3 indicates that the Major alarm X which was turned on at 15:00, October 1 is turned off at 3:10, October 2. The top address of this screen is F8200H of the screen data storage section 157.

Figure 23:
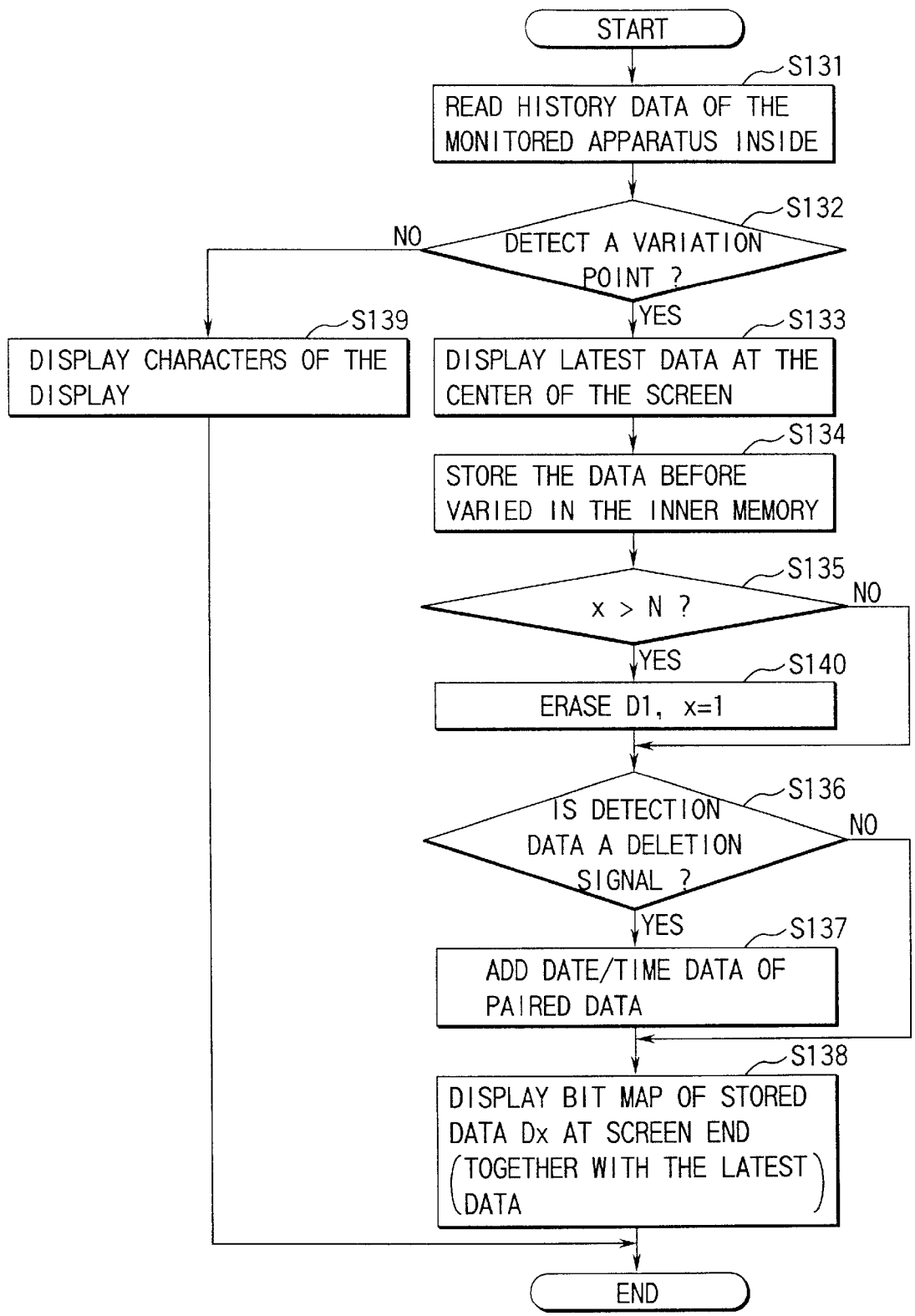
FIG. 23 is a flow chart explaining operations of the monitor and control terminal.

FIG. 23 is a flow chart explaining the operations of the monitor and control terminal 150, which reads the history data (Log data) of the monitored apparatus 160 by the communication control section 153 and makes the reception data storage section 154 store the history data (step S131).

Next, the condition matching detection section 155 reads the reception data from the reception data storage section 154 to determine whether the data matches with the conditions stored in the condition storage section 152 or not (step S132). When the read data matches with the stored conditions, the condition matching detection section 155 generates screen data on the basis of the reception data, and the screen display control section 158 displays a screen based on current data (after varied) to be large at the center of the screen (step S133).

After that, the condition matching detection section 155 allows the data before varied to be stored in Dx (where x=1, . . . , N) inside the storage table of the history data storage section 156 (step S134).

At this time, the condition matching detection section 155 determines whether the number of the stored data items exceeds the maximum value N (x>N) or not (step S135). If the number of the stored data items exceeds the maximum value N, the condition matching detection section 155 deletes the oldest data ( D1) in the history data storage section 156 to set x=1 (step S140), and proceeds to step S136. If the number of the stored data items does not exceed the maximum value N, step S135 proceeds to step S136.

At step S136, the condition matching detection section 155 checks whether the storage data in the history data storage section 156 includes a paired variation or not, i.e. whether the data whose matching is detected at the current time is the recovery information about the data whose matching has been previously detected. In FIG. 22, for example, when x=3, the Major alarm X is detected to be OFF, which is the recovery information of the Major alarm at ON when x=1. With YES at step S136, the date/time of the paired data items is added to the storage table (step S137), and the control proceeds to step S138. In the above-described example, when x=3, October 1/15:00' at which the Major alarm X has been turned on is added to the ON date/time of D3, and October 2/3:10' at which the Major alarm X has been turned off is added to the OFF date/time of D1.

With NO at step S136, the control proceeds to step S138. At step S138, the screen display control section 158 reads the data of the screen which the operator has designated through the operation section 151, out of the screen data storage section 157 by referring to the screen data top address on the storage data table, and displays the screen at screen edge on the display. Thus, the previous screen is displayed at the edge of the display, together with the latest screen that is largely displayed at the center of the display.

When the data does not match with the conditions stored in the condition storage section 152 at step S132, the read data is displayed on the display as characters (step S139).

As explained above, in the exemplified embodiment, when the matching of the conditions is detected, the screen displayed by the terminal is formed by the general program process and a plurality of stored previous screens are displayed simultaneously with the current, latest screen. Since the screen data is managed inside the monitor and control terminal 150 together with the conditions, the time, the order of display and the like, parts of the screens or the entire screens can be displayed in any order, desired screens can be searched or unnecessary screens can be deleted in accordance with the instructions from the operation section 151.

Figure 24A:
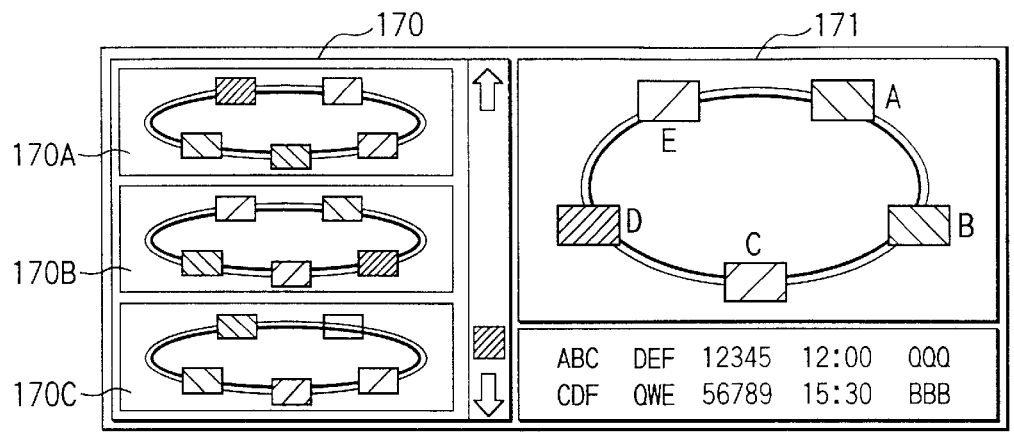
FIGS. 24A–24C are views showing an example of screen display.
Figure 24B:
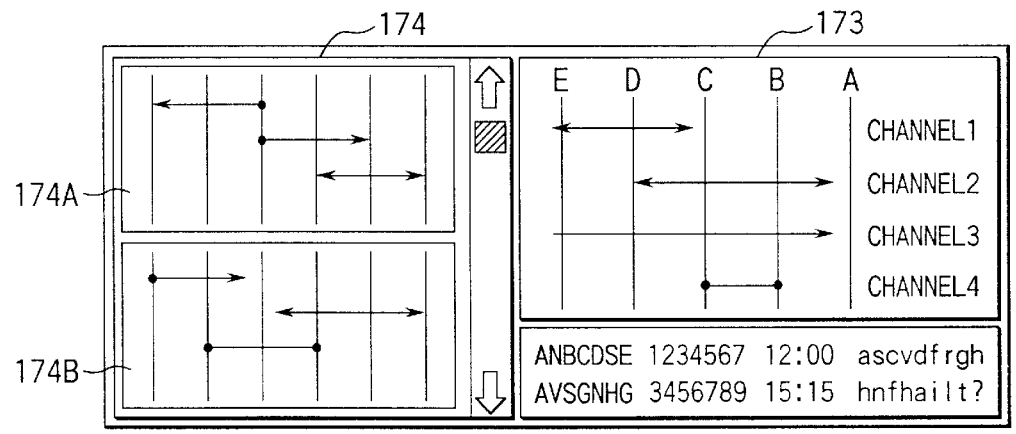
Figure 24C:
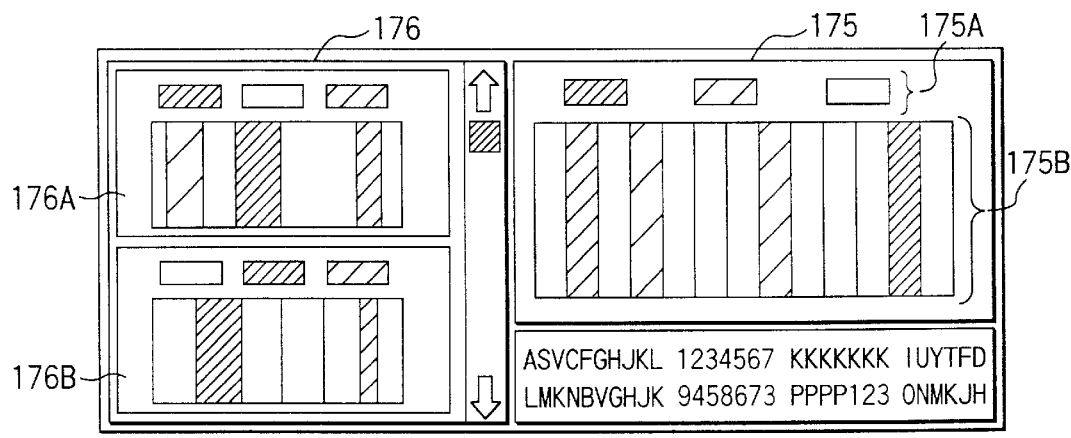

FIGS. 24A, 24B and 24C illustrate the examples of the screen display. FIGS. 24A and 24C illustrate the state variations in the configuration diagram of the apparatuses and the like, and FIG. 24B illustrates the variations in the graphs about the setting of apparatuses and the like.

In FIG. 24A, a right screen 171 is a screen of the latest state in which a communication connection is established between every two of nodes A to E. 170A, 170B and 170C in a left screen 170 are three screens each showing the previous state, which is the state variation of the communication connection. Since screens D1 to DN are stored in the screen data storage section 157, the screens D1 to DN can be scrolled on the display.

In FIG. 24B, a right screen 173 shows a screen for the latest state of the graph about the setting of the apparatuses or the like. 174A and 174B in a left screen 174 represent two screens showing the previous history states, which indicate the state variations in the graph. Also in FIG. 24B, similarly to FIG. 24A, the screens D1 to DN can be scrolled on the display.

In FIG. 24C, an upper screen 175A in a right screen 175 shows the severity in the alarm at the abnormality of the input signal, and the severity becomes higher as the width of the hatching becomes smaller. A lower screen 175B shows the severity in the alarm at the fault of hardware such as a board or the like, and the severity becomes higher as the width of the hatching becomes smaller. 176A and 176B in a left screen 176 represent two screens showing the previous history states, which are variations in the state of the alarm.

Also in FIG. 24C, similarly to FIGS. 24A and 24B, the screens D1 to DN can be scrolled on the display.

In the exemplified embodiment, the current screen can be largely displayed and the previous screens can be scrolled, and therefore, the operational error can be easily prevented or found.

As described above, according to the present invention, a plurality of screens showing the states at the detection of variation points can be displayed simultaneously with the latest screen. For this reason, even when the operator is absent from the monitor and control terminal, it is possible to review whether any state variations have occurred in the monitored apparatus during absence of the operator or what history has existed until the current time, as the state transfer screens simultaneously with the current screen.

Next, a fourth embodiment of the present invention will be explained in detail.

Figure 25:
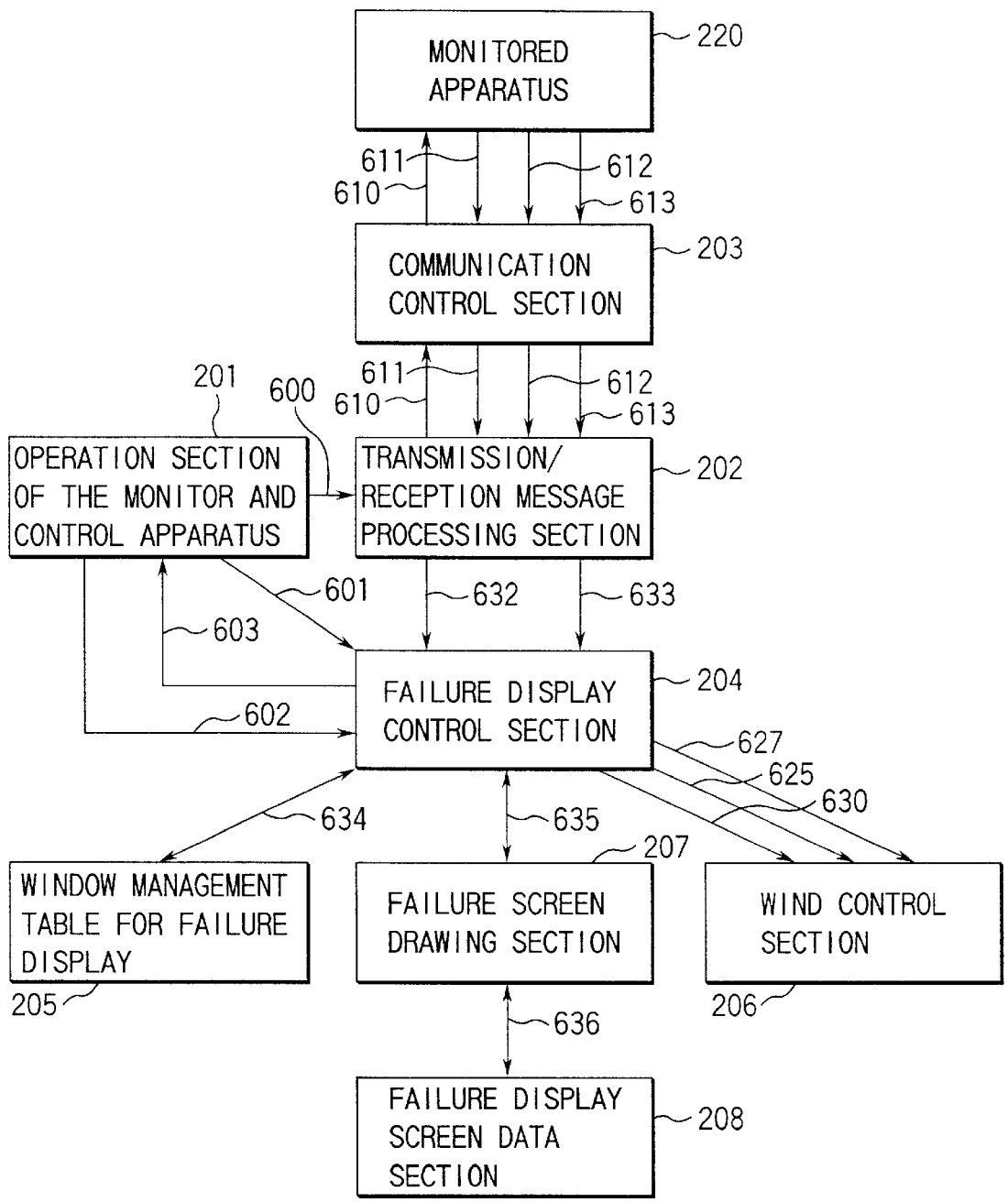
FIG. 25 is a block diagram showing a flow of process in a fourth embodiment of the present invention.

FIG. 25 is a block diagram showing a flow of processes according to the fourth embodiment of the present invention. When the operator transmits a request 600 for reading a failure state of a monitored apparatus 220, through an operation section 201 of the monitor and control apparatus, to a transmission/reception message processingsection 202, the transmission/reception message processing section 202 generates a request message 610 for reading failure information relating to the monitored apparatus 220 and transmits the request message 610 to the monitored apparatus 220 via a communication control section 203.

In response to the request message 610, the monitored apparatus 220 transmits one or more of response messages 611 for reading the failure information, to the transmission/reception message processing section 202 via the communication control section 203.

The transmission/reception message processing section 202 reads the information about an occurrence position of failure and the severity for the failure, of one or more of the received response messages 611, and forwards to a failure display control section 204 the failure occurrence position information, the severity information and event information representing the reading of the failure state, as a failure information screen display request 632.

The failure display control section 204 determines a failure display position and a failure display color in accordance with the failure occurrence position information and the severity information, and determines the order of priority for the window display. After that, the failure display control section 204 determines a new window to be opened, by referring to a window management table 205 for the failure display. The window management table 205 is a table for managing a window identifier of a failure display window which has already been opened at this time. The failure display control section 204 causes a window control section 206 to display windows in the order of lower priority. At this time, every time the windows are displayed sequentially, the failure display control section 204 forwards a front display request 625 to the window control section 206 so as to allow the windows of higher priority to be displayed on the windows of lower priority. Further, when the window which should be displayed has not yet been opened, the failure display control section 204 also forwards a request 627 for generation of a new window to the window control section 206.

Next, the failure display control section 204 forwards a new drawing flag, a window identifier, a screen identifier, a failure display position and a failure display color to a failure screen drawing section 207.

When the new drawing flag represents new drawing, the failure screen drawing section 207 reads failure display screen data which should be displayed, from a failure display screen data section 208 and draws the data on a window which is identified by the window identifier. Further, the failure display screen data section 207 draws the failure display screen on the window, on the basis of the failure display position and the failure display color received from the failure display control section 204.

Figure 26:
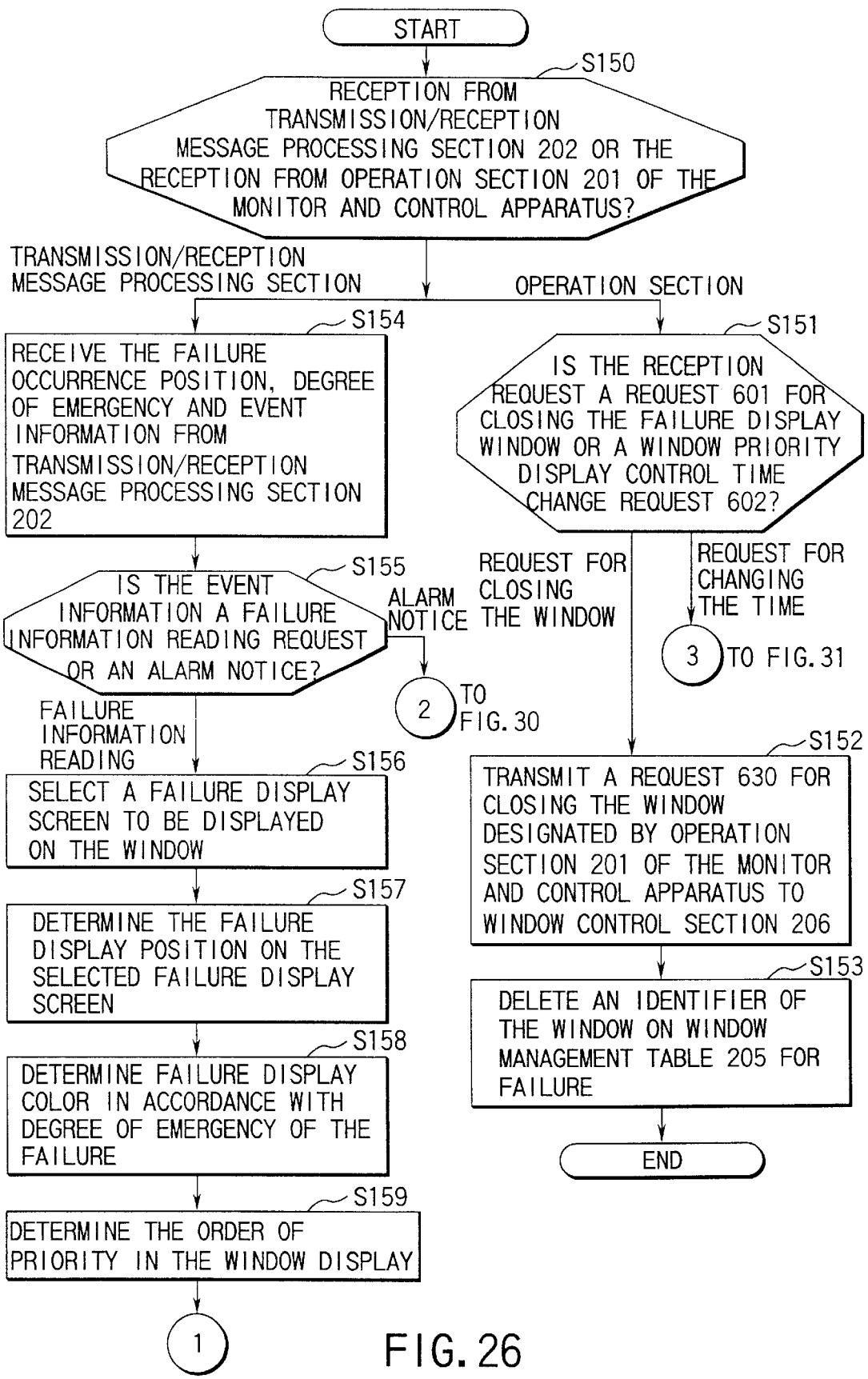
FIG. 26 is a former part of a flow chart showing details of a process in a failure display and control section 204.

FIG. 26 is a flow chart showing in detail the process of the failure display control section 204.

First, the failure display control section 204 determines the reception from the transmission/reception message processing section 202 or that from the operation section 201 of the monitor and control apparatus (step S150). In the case of the reception from the transmission/reception message processing section 202, the failure display control section 204 receives the failure occurrence position information, the severity degree information and the event information from the transmission/reception message processing section 202 (step S154). Then, the failure display control section 204 determines whether the event information is a failure information read response or an alarm information (step S155). If the event information is an alarm information, the failure display control section 204 executes steps of FIG. 30 to be described later. If the event information is a failure information read response, the failure display control section 204 selects the screen for failure display which should be displayed on the window, from a plurality of screens for failure display (step S156) and determines which part of the screen should be displayed as failure (step S157), in accordance with the information about the failure occurrence position. In addition, the failure display control section 204 determines the failure display color to every part that displays a failure, on the basis of the degree of its severity (step S158).

Next, the failure display control section 204 determines the failure with the highest severity, of the failures displayed on the screens, for every failure display screen, and defines the severity of the failure as the highest severity of the screen. The failure display control section 204 compares the highest severity in each failure display screen by sorting process and the like, and determines the order of priority in the screens on the basis of the highest severities in the respective screens (step S159). The order of priority is regarded as the order of priority in the window display.

Figure 28:
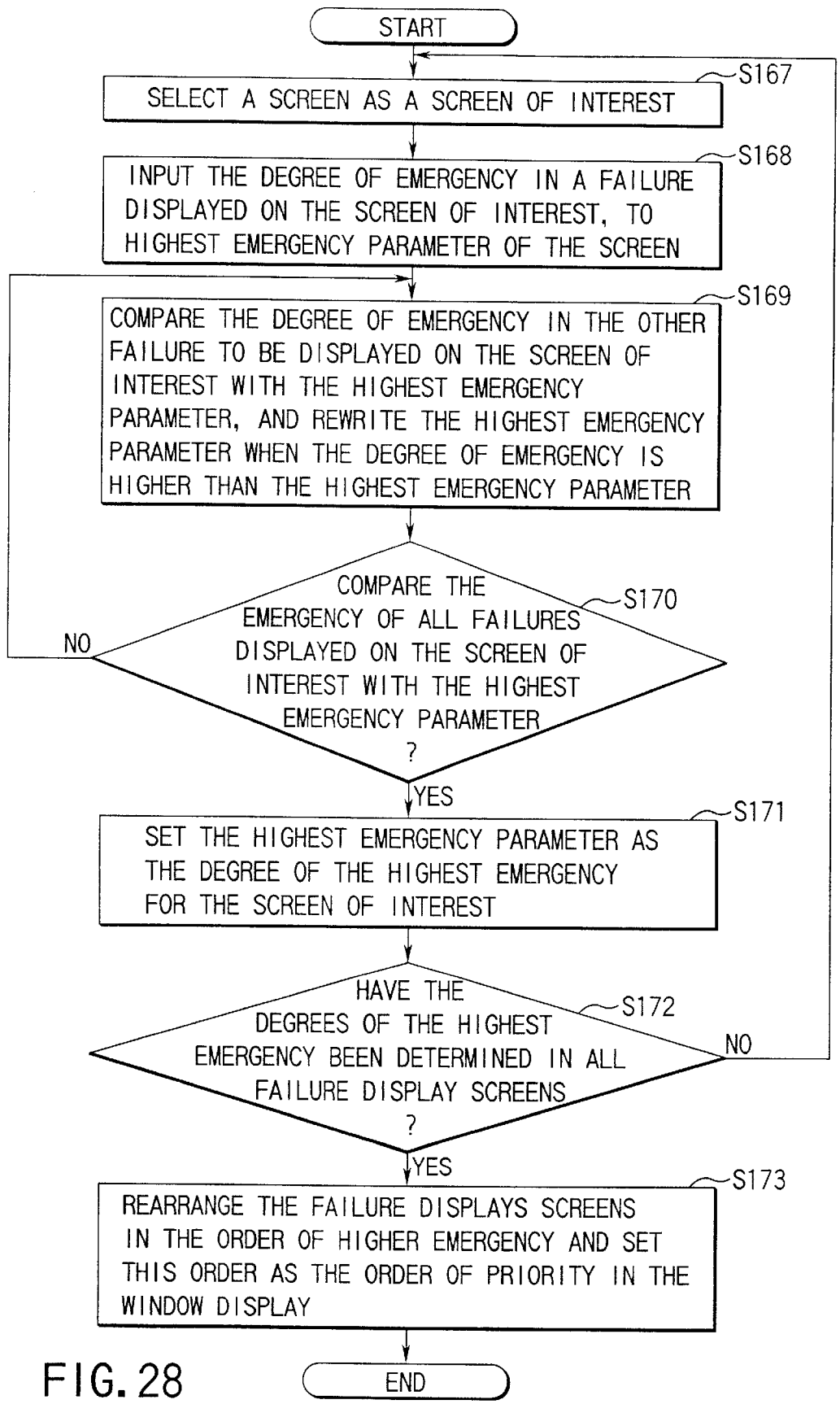
FIG. 28 is a flow chart explaining process steps of determining an order of window display.

FIG. 28 is a flow chart showing in detail the process steps of determining the order of priority in the window display.

First, the failure display control section 204 selects one screen from a plurality of failure display screens as an screen of interest (step S167). Then, the failure display control section 204 selects a failure from one or more of failures which should be displayed on the screen of interest, and inputs the severity of the failure in a highest severity parameter of the screen (step S168). The failure display control section 204 compares the severity of the other failures displayed on the screen of interest with the highest severity parameter. When the severity of the other failure is higher than the highest severity parameter, the failure display control section 204 rewrites the highest severity parameter to severity of the other failure (step S169). The failure display control section 204 determines whether the comparison of all the failures displayed on the screen of interest with the highest severity parameter has been finished (step S170). In the case of NO, the process returns to step S169. In the case of YES, the highest severity parameter is set as the highest severity on the screen of interest (step S171).

Next, the failure display control section 204 determines whether the highest severities have been determined for all the failure display screens (step S172). In the case of NO, the process returns to step S167, and any of the other screen is selected from a plurality of failure display screens and regarded as a new screen of interest. In the case of YES, the failure display screens are arranged in the order of higher severity. This order is regarded as the window display priority order (step S173).

Figure 27:
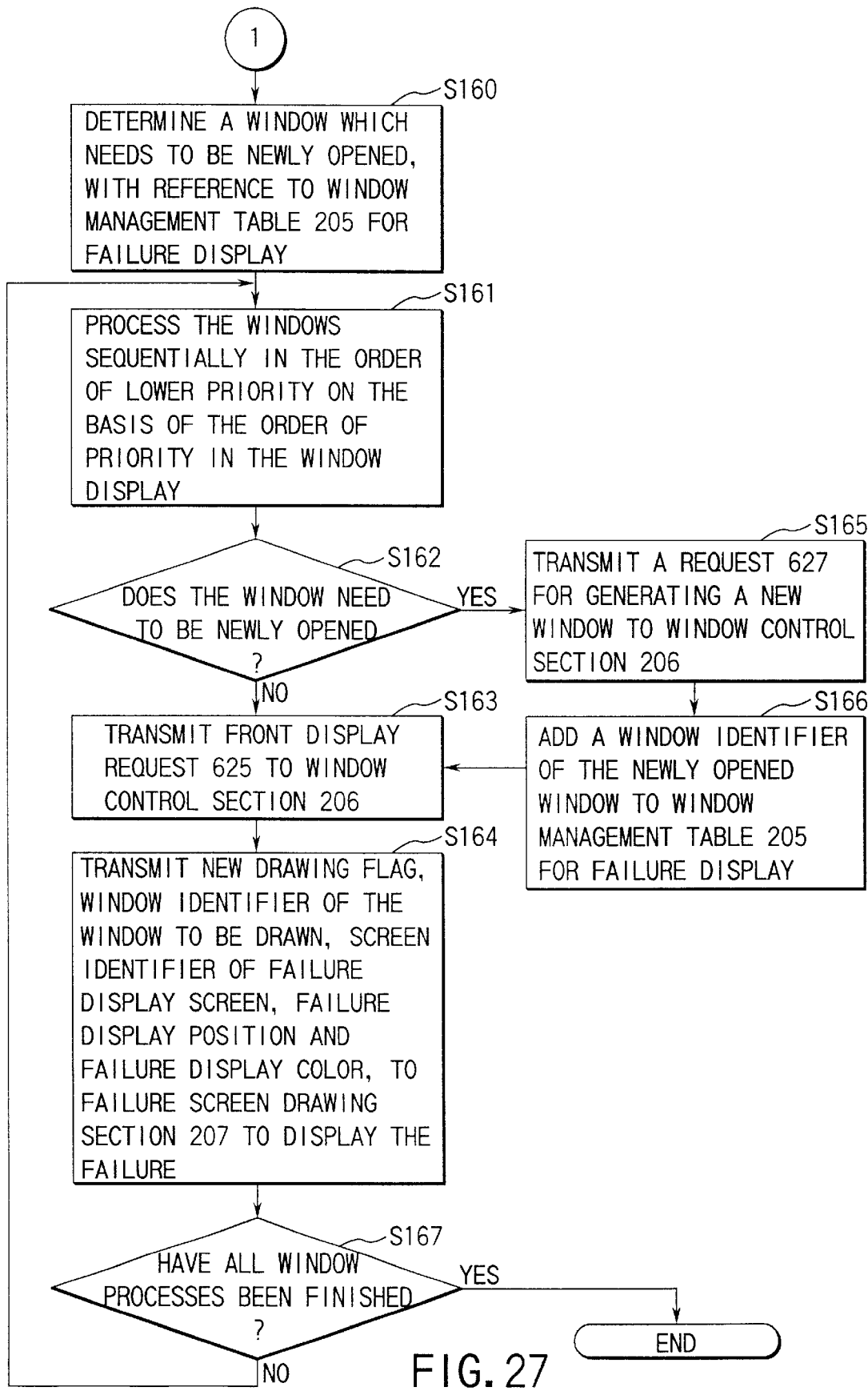
FIG. 27 is a latter part of a flow chart showing details of a process in a failure display and control section 204.

Step S160 of FIG. 27 is executed after the order of priority has been determined at step S159 of FIG. 26. At step S160, the failure display control section 204 executes referring 634 to the window management table 205 for failure display which it manages by itself and obtains the information about the window for failure display which is opened at this time. The failure display control section 204 determines a window which should be newly opened, of the windows which should be displayed, on the basis of the result of the referring (step S160).

Next, in accordance with the order of priority in the window display, the failure display control section 204 causes the failure screen drawing section 207 to process the windows for failure display, sequentially in the order of lower priority (step S161).

The failure display control section 204 determines whether the windows processed at step S161 had been already opened. That is, the failure display control section 204 determines whether a new window needs to be opened (step S162).

When no window needs to be opened, the failure display control section 204 forwards a front display request 625 to the window control section 206 so that the window processed at step S161 can be displayed on the top of the overlapped windows.

When it is determined at step S162 that a new failure display window needs to be opened, the failure display control section 204 forwards the request 627 for new window generation to the window control section 206 (step S165). After that, the failure display control section 204 adds the window identifier, which has been obtained from the window control section 206 at the generation of the window, to the window management table 205 for failure display (step S166). The failure display control section 204 forwards the front display request 625 to the window control section 206 so that the window whose generation has been requested at step S165 can be displayed on the top of the overlapped windows (step S163).

Next, the failure display control section 204 forwards a new drawing flag representing whether drawing needs to be newly executed or not, a window identifier for a window which is to be drawn, a screen identifier for identifying th screen for failure display which is displayed on the window, the information about the failure display position, and the information about the failure display color, to the failure screen drawing section 207 and, after generating a new window as occasion requires, allows the failure to be displayed on this window (step S164). Thus, failure display control section 204 allows the failures to be displayed sequentially one after one in the order of lower priority, determines whether the process of all the windows has been finished at step S167, and returns to step S161 if the windows which have not yet been processed are left.

Figure 31:
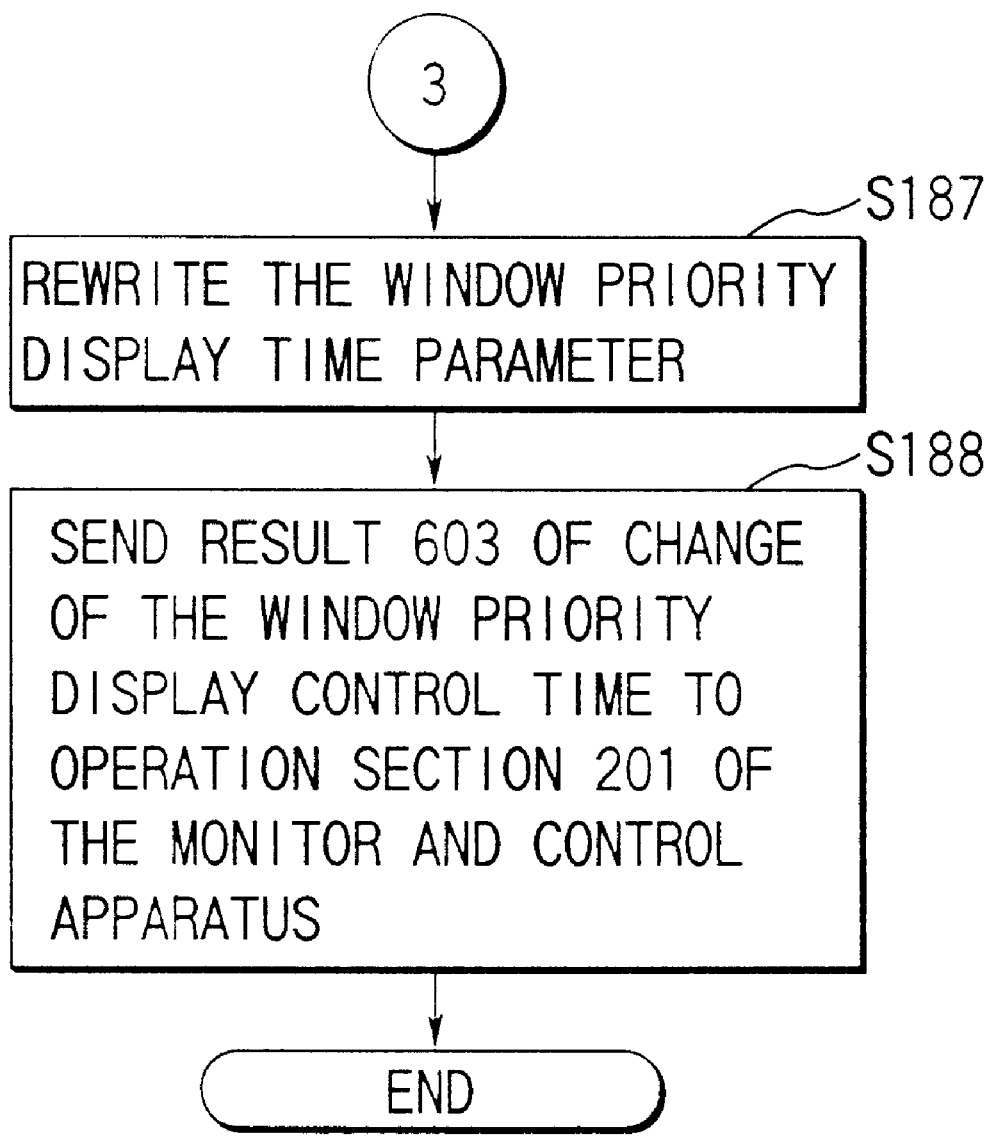
FIG. 31 is a flow chart explaining a modified example having additionally a function of changing a time range where priority display and control of windows is executed, by operations of an operation section 201 of the monitor and control apparatus.

In the flow chart of FIG. 26, when the reception from the operation section 201 of the monitor and control apparatus is determined at step S150, the failure display control section 204 determines whether this received request is a request 601 for closing the window for failure display or a request 602 for changing the time for the window priority display control, and executes steps of FIG. 31 to be described later if it is the request 602.

When the failure display controls section 204 receives the request 601 for closing the window for failure display from the operation section 201 of the monitor and control apparatus, the failure display controls section 204 determines a window identifier of the window which should be closed, forwards a request 630 for closing the window to the window control section 206 (step S152) and deletes the window identifier of the closed window on the window management table 205 (step S153).

Figure 29:
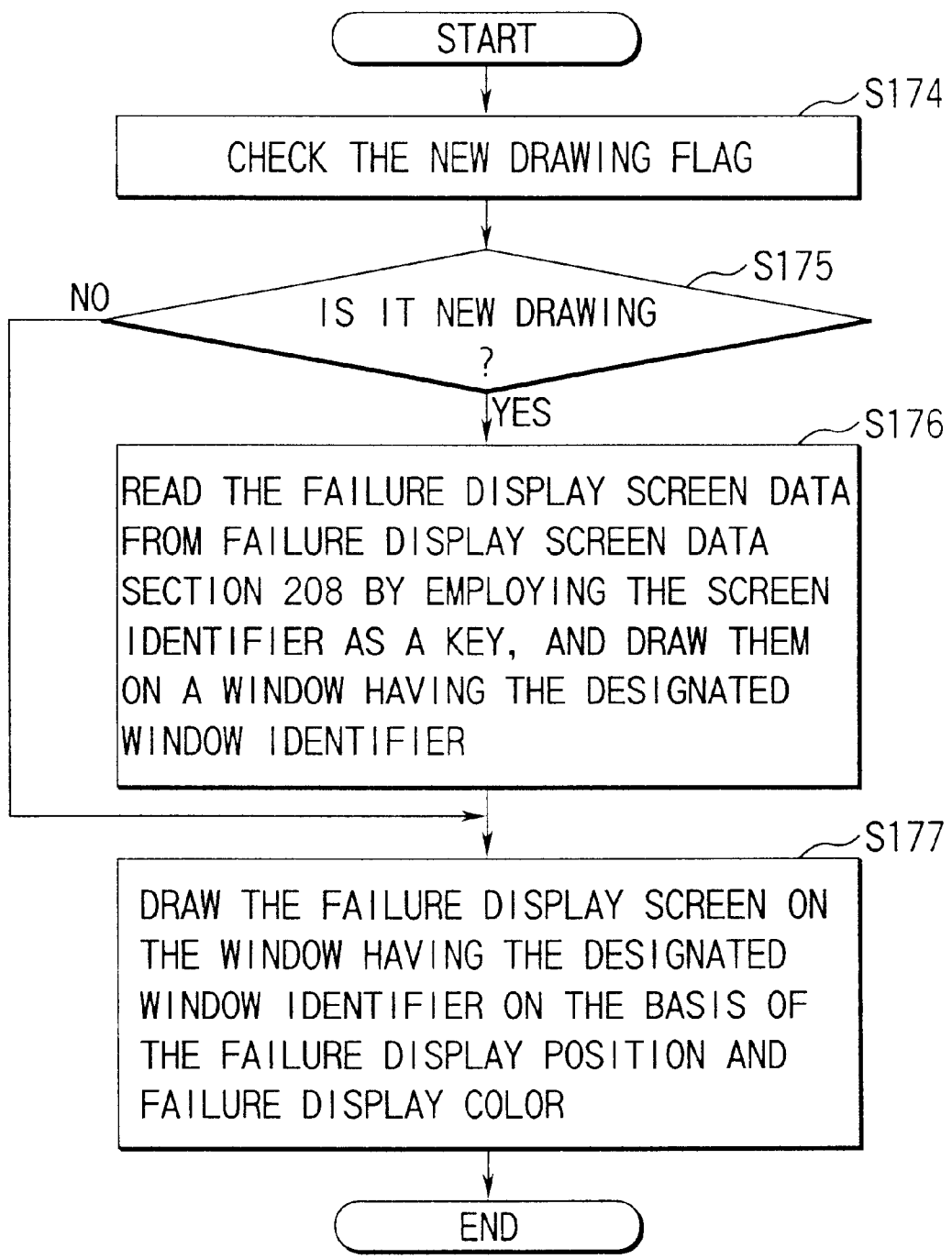
FIG. 29 is a flow chart explaining details of a process in a failure screen draw and process section 207.

The process of the failure screen drawing section 207 will be explained below in detail with reference to FIG. 29.

The failure screen drawing section 207 checks the new drawing flag received from the failure display controls section 204 and determines whether it is the new drawing or not (steps S174 and S175). When it is the new drawing, the failure screen drawing section 207 forwards a request 636 for reading to the failure display screen data section 208 by using the screen identifier as a key to read the failure display screen data, and draws the screen data on the window having the designated window identifier (step S176). Further, on the basis of he information about the failure display position and the failure display color, the failure screen drawing section 207 allows the failure display screen to be drawn on the window having the designated window identifier (step S177). When it is determined at step S175 that the new drawing flag is not a new drawing, the failure screen drawing section 207 executes the process at step S177 without executing that at step S176.

Next, an embodiment where the transmission/reception message processing section 202 receives an alarm notice message 612 from the monitored apparatus 220 will be explained.

When a failure occurs, the monitored apparatus 220 generates the alarm notice message 612 and transmits the alarm notice message 612 to the transmission/reception message processing section 202 via the communication control section 203. The transmission/reception message processing section 202 reads the information about the failure occurrence position and the severity for the failure out of the received alarm notice message 612 and forwards these information items and the event information indicating the reception of the alarm notice to the failure display control section 204 as a request 633 for displaying an alarm notice screen. The failure display control section 204 determines the order of priority for the window displays according to the manner described in FIG. 28, in response to the alarm notices received within a predetermined time. Processes following this is the same as that in the reading of the failure state.

Figure 30:
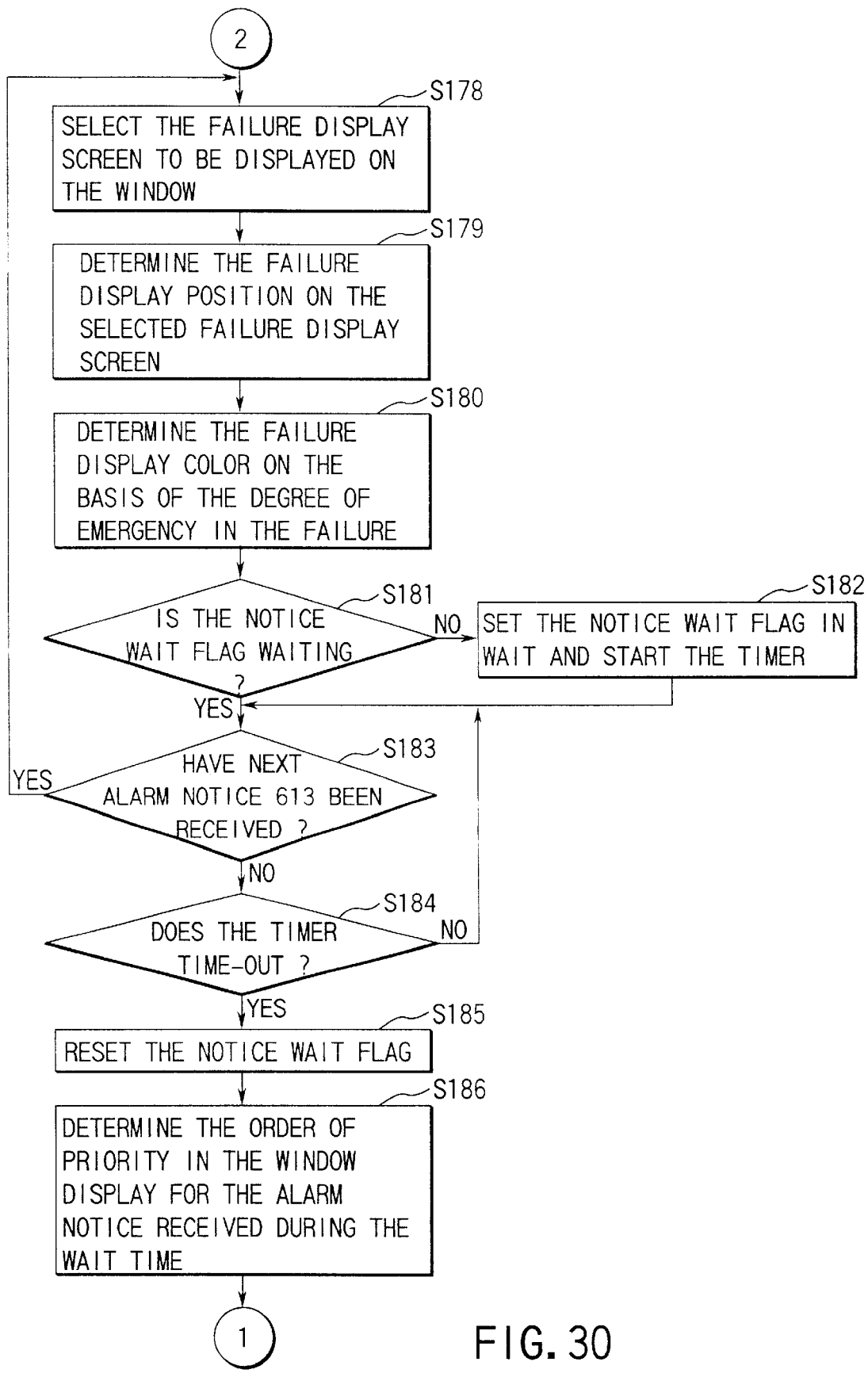
FIG. 30 is a flow chart showing details of the process of failure display and control section 204, according to a modified example of a fourth embodiment of the present invention.

FIG. 30 is a flow chart showing in detail the process of the failure display control section 204 in a modified example of the fourth embodiment.

When the event information is the alarm notice, the failure display control section 204 selects the screen for failure display which should be displayed on the window, from a plurality of failure display screens, in accordance with the noticed failure occurrence position information (step S178), and determines on which part of the screen the failure should be displayed (step S179). The failure display control section 204 determines the failure display color on the basis of the severity about the alarm notice (step S180).

After that, the failure display control section 204 confirms a notice wait flag indicating whether or not to wait for a next alarm notice and determines whether or not this notice wait flag represents "wait" (step S181). If the notice wait flag represents "wait", the process proceeds to step S183. If the notice wait flag does not represent "wait", the failure display control section 204 sets the notice wait flag to be "wait" and allows the timer to be started (step S182) and the process proceeds to step S183.

At step S183, the failure display control section 204 determines whether a next alarm notice message 613 to be noticed later has been received or not. If the next alarm notice message 613 has been received, the process returns to step S178 and the same process as that of the initial alarm notice message 612 is executed. If the next alarm notice message 613 has not been received, the process proceeds to step S184.

At step S184, the failure display control section 204 determines whether the time registered in the window priority display control time parameter has passed or not, i.e. whether the time is out or not. If the time is not out, the process returns to step S183. If the time is out, the process proceeds to step S185 at which the failure display control section 204 resets the notice wait flag, and after that, the process proceeds to step S186.

At step S186, according to the alarm notice messages 612 and 613 received during the wait time, including the initial alarm notice message 612, the failure display control section 204 determines the order of priority of the windows for failure display for displaying the noticed failure, in the same process as the process in which the order of priority in the window display has been determined at the reading of the failure state as described above (step S186).

The following process of the failure display control section 204 is the same as the process of the failure display control section 204 at the reading of the failure state as described above.

Next, a modified example having an additional function of changing the time range for executing the window priority display control by the operations of the operation section 201 of the monitor and control apparatus when a plurality of alarm notices are received, will be explained. In FIG. 31, the operation section 201 of the monitor and control apparatus forwards the time change request 602 for the window priority display control to the failure display control section 204. According to this time change request 602, the failure display control section 204 rewrites the window priority display control time parameter (step S187), and sends back the result 603 of the change of time for the window priority display control to the operation section 201 of the monitor and control apparatus (step S188).

As described above, according to the present invention, in a case where a plurality of apparatus failures having different severities occur simultaneously at different sub-racks and a case where apparatus failures having different severities occur at different sub-racks in a predetermined period, when the monitor and control system is to display the failure occurrence position of the apparatus in which the failure has occurred, the monitor and control system can allow the failure having the higher severity to be displayed with priority to the operator by displaying the window which displays the failure having a higher severity above the window which displays the failure having a lower severity.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A monitor and control system comprising a network constituted by a plurality of monitored apparatus, and one or more of monitor and control terminals for monitoring and controlling the respective monitored apparatuses, wherein each of said monitor and control terminals comprises:

means for reading information about states of one or more of failures occurring in said monitored apparatuses, via communication means;

means for comparing severities in a plurality of failures read from the respective monitored apparatuses with one another and determining order of priority for the window display; and means for displaying windows so that a window of higher priority overlaps on a window of lower priority in accordance with the determined order of priority in the window display.

2. A monitor and control system according to claim 1, wherein each of said monitor and control terminals comprises:

means for receiving one or more of alarm notices noticed from each of said monitored apparatuses when the failures occur; and means for waiting in a predetermined time after receiving an alarm notice and for storing information about a severity of failure included in the alarms notices received from each of said monitored apparatuses during waiting wherein the alarm notices including the alarm notice that has caused the wait start, and said determination means compares the severities in a plurality of failures stored in said storage means with one another and determines the order of priority in the window display.

3. A monitor and control system according to claim 1, further comprising means for changing said predetermined time.

* * * * *

UNITED STATES PATENT AND TRADEMARK OFFICE
CERTIFICATE OF CORRECTION

PATENT NO. : 6,665,267 B1
DATED : December 16, 2003
INVENTOR(S) : Iwasaki et al.

It is certified that error appears in the above-identified patent and that said Letters Patent is hereby corrected as shown below:

Title page,
Item [57], ABSTRACT,
Line 1, change "provides to an" to -- provides an --.

Column 23,
Line 6, change "apparatus," to -- apparatuses, --.

Column 24,
Line 9, change "alarms" to -- alarm --.

Signed and Sealed this

Twenty-fourth Day of February, 2004

JON W. DUDAS
*Acting Director of the United States Patent and Trademark Office*